(12) United States Patent
Donovan

(10) Patent No.: US 11,802,943 B2
(45) Date of Patent: Oct. 31, 2023

(54) NOISE ADAPTIVE SOLID-STATE LIDAR SYSTEM

(71) Applicant: OPSYS Tech Ltd., Holon (IL)

(72) Inventor: Mark J. Donovan, Mountain View, CA (US)

(73) Assignee: OPSYS Tech Ltd., Holon (IL)

( * ) Notice: Subject to any disclaimer, the term of this patent is extended or adjusted under 35 U.S.C. 154(b) by 503 days.

(21) Appl. No.: 16/168,054

(22) Filed: Oct. 23, 2018

(65) Prior Publication Data
US 2019/0146071 A1   May 16, 2019

Related U.S. Application Data

(60) Provisional application No. 62/586,557, filed on Nov. 15, 2017.

(51) Int. Cl.
*G01S 7/486* (2020.01)
*G01S 7/487* (2006.01)
(Continued)

(52) U.S. Cl.
CPC ............ *G01S 7/4868* (2013.01); *G01S 7/487* (2013.01); *G01S 7/4815* (2013.01);
(Continued)

(58) Field of Classification Search
CPC .......... G01S 17/89; G01S 7/497; G01S 17/10; G01S 7/4972; G01S 17/04; G01S 17/931;
(Continued)

(56) References Cited

U.S. PATENT DOCUMENTS

| 5,157,257 A | 10/1992 | Geiger |
| 5,552,893 A | 9/1996 | Akasu |

(Continued)

FOREIGN PATENT DOCUMENTS

| CN | 1512946 A | 7/2004 |
| CN | 101013030 A | 8/2007 |

(Continued)

OTHER PUBLICATIONS

Notification Concerning Transmittal of International Preliminary Report on Patentability (Chapter I of the Patent Cooperation Treaty) for International Application No. PCT/US18/041021, dated Feb. 6, 2020, 10 pages, The International Bureau of WIPO, Geneva, Switzerland.

(Continued)

*Primary Examiner* — Luke D Ratcliffe
(74) *Attorney, Agent, or Firm* — Rauschenbach Patent Law Group, PLLC; Kurt Rauschenbach

(57) ABSTRACT

A light detection and ranging (LIDAR) system includes an optical transmitter comprising a plurality of lasers, where each of the plurality of lasers illuminates a field-of-view. A transmitter controller is configured to pulse desired ones of the plurality of lasers so that the plurality of lasers generate light in a desired illumination region. An optical receiver comprises a plurality of detectors positioned to detect light over the desired illumination region. The plurality of detectors generates an electrical detection signal. A time-of-flight measurement circuit measures the time-of-flight of light from the plurality of lasers to the plurality of detectors. The optical receiver calculates range information from the time-of-flight measurements. A receiver controller is electrically connected to the transmitter controller and is configured to bias at least some of the plurality of detectors at a bias point that achieves a desired detection signal noise level.

13 Claims, 17 Drawing Sheets

(51) Int. Cl.
    *G01S 7/4863* (2020.01)
    *G01S 17/42* (2006.01)
    *G01S 7/481* (2006.01)
    *G01S 17/931* (2020.01)

(52) U.S. Cl.
    CPC .......... *G01S 7/4863* (2013.01); *G01S 7/4876* (2013.01); *G01S 17/42* (2013.01); *G01S 17/931* (2020.01)

(58) Field of Classification Search
    CPC ...... G01S 17/42; G01S 7/4863; G01S 7/4868; G01S 7/4861; G01S 7/486; G01S 7/4814; G01S 7/4815; G01S 7/4876; G01S 17/93; G01S 7/4808; G01S 7/4817; G01S 7/484; G02B 26/0858; G02B 26/10; G08G 1/04; G08G 1/166; B60Q 1/0023; B60Q 1/26; G05D 1/024; G05D 2201/0213
    See application file for complete search history.

(56) References Cited

U.S. PATENT DOCUMENTS

| | | |
|---|---|---|
| 5,909,296 A | 6/1999 | Tsacoyeanes |
| 6,057,909 A | 5/2000 | Yahav et al. |
| 6,061,001 A | 5/2000 | Sugimoto |
| 6,246,708 B1 | 6/2001 | Thornton et al. |
| 6,353,502 B1 | 3/2002 | Marchant et al. |
| 6,680,788 B1 | 1/2004 | Roberson et al. |
| 6,717,972 B2 | 4/2004 | Steinle et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,860,350 B2 | 3/2005 | Beuhler et al. |
| 6,888,871 B1 | 5/2005 | Zhang et al. |
| 7,065,112 B2 | 6/2006 | Ghosh et al. |
| 7,110,183 B2 | 9/2006 | von Freyhold et al. |
| 7,544,945 B2 | 6/2009 | Tan et al. |
| 7,652,752 B2 | 1/2010 | Fetzer et al. |
| 7,702,191 B1 | 4/2010 | Geron et al. |
| 7,746,450 B2 | 6/2010 | Willner et al. |
| 7,773,204 B1 | 8/2010 | Nelson |
| 7,969,558 B2 | 6/2011 | Hall |
| 8,072,581 B1 | 12/2011 | Breiholz |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,348,018 B2 | 5/2016 | Eisele et al. |
| 9,360,554 B2 | 6/2016 | Retterath et al. |
| 9,378,640 B2 | 6/2016 | Mimeault et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,575,184 B2 | 2/2017 | Gilliland et al. |
| 9,658,322 B2 | 5/2017 | Lewis |
| 9,674,415 B2 | 6/2017 | Wan et al. |
| 9,791,557 B1 | 10/2017 | Wyrwas et al. |
| 9,841,495 B2 | 12/2017 | Campbell et al. |
| 9,857,468 B1 | 1/2018 | Eichenholz et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,007,001 B1 | 6/2018 | LaChapelle et al. |
| 10,063,849 B2 | 8/2018 | Pacala et al. |
| 10,191,156 B2 | 1/2019 | Steinberg et al. |
| 10,295,660 B1 | 5/2019 | McMichael et al. |
| 10,488,492 B2 | 11/2019 | Hamel et al. |
| 10,514,444 B2 | 12/2019 | Donovan |
| 10,761,195 B2 | 9/2020 | Donovan |
| 10,928,486 B2 | 2/2021 | Donovan |
| 11,016,178 B2 | 5/2021 | Donovan |
| 11,061,234 B1 | 7/2021 | Zhu et al. |
| 11,320,538 B2 | 5/2022 | Donovan et al. |
| 11,513,195 B2 | 11/2022 | Donovan et al. |
| 2002/0117340 A1 | 8/2002 | Stettner |
| 2002/0195496 A1 | 12/2002 | Tsikos |
| 2003/0043363 A1 | 3/2003 | Jamieson et al. |
| 2003/0123040 A1 | 7/2003 | Almogy |
| 2003/0147652 A1 | 8/2003 | Green et al. |
| 2004/0120717 A1 | 6/2004 | Clark et al. |
| 2004/0228375 A1 | 11/2004 | Ghosh et al. |
| 2005/0025211 A1 | 2/2005 | Zhang et al. |
| 2005/0180473 A1 | 8/2005 | Brosnan |
| 2005/0232628 A1 | 10/2005 | von Freyhold et al. |
| 2006/0132752 A1 | 6/2006 | Kane |
| 2006/0231771 A1 | 10/2006 | Lee et al. |
| 2006/0244978 A1 | 11/2006 | Yamada et al. |
| 2007/0024849 A1 | 2/2007 | Carrig et al. |
| 2007/0071056 A1 | 3/2007 | Chen |
| 2007/0091960 A1 | 4/2007 | Gauggel et al. |
| 2007/0131842 A1 | 6/2007 | Ernst |
| 2007/0177841 A1 | 8/2007 | Dazinger |
| 2007/0181810 A1 | 8/2007 | Tan et al. |
| 2007/0219720 A1 | 9/2007 | Trepagnier et al. |
| 2008/0074640 A1 | 3/2008 | Walsh et al. |
| 2008/0186470 A1 | 8/2008 | Hipp |
| 2009/0027651 A1 | 1/2009 | Pack et al. |
| 2009/0140047 A1 | 6/2009 | Yu et al. |
| 2009/0161710 A1 | 6/2009 | Hoashi et al. |
| 2009/0273770 A1 | 11/2009 | Bauhahn et al. |
| 2009/0295986 A1 | 12/2009 | Topliss et al. |
| 2010/0046953 A1 | 2/2010 | Shaw et al. |
| 2010/0215066 A1 | 8/2010 | Mordaunt et al. |
| 2010/0271614 A1 | 10/2010 | Albuquerque et al. |
| 2010/0302528 A1 | 12/2010 | Hall |
| 2011/0176567 A1 | 7/2011 | Joseph |
| 2011/0216304 A1 | 9/2011 | Hall |
| 2012/0038903 A1 | 2/2012 | Weimer et al. |
| 2013/0163626 A1 | 6/2013 | Seurin et al. |
| 2013/0163627 A1 | 6/2013 | Seurin et al. |
| 2013/0206967 A1 | 8/2013 | Shpunt et al. |
| 2013/0208256 A1 | 8/2013 | Mamidipudi et al. |
| 2013/0208753 A1 | 8/2013 | Van Leeuwen et al. |
| 2014/0043309 A1 | 2/2014 | Go et al. |
| 2014/0049610 A1 | 2/2014 | Hudman et al. |
| 2014/0071427 A1 | 3/2014 | Last |
| 2014/0111812 A1 | 4/2014 | Baeg et al. |
| 2014/0139467 A1 | 5/2014 | Ghosh et al. |
| 2014/0160341 A1 | 6/2014 | Tickoo et al. |
| 2014/0218898 A1 | 8/2014 | Seurin et al. |
| 2014/0247841 A1 | 9/2014 | Seurin et al. |
| 2014/0267701 A1 | 9/2014 | Aviv et al. |
| 2014/0303829 A1 | 10/2014 | Lombrozo et al. |
| 2014/0312233 A1 | 10/2014 | Mark et al. |
| 2014/0333995 A1 | 11/2014 | Seurin et al. |
| 2014/0350836 A1 | 11/2014 | Stettner et al. |
| 2014/0376092 A1 | 12/2014 | Mor |
| 2015/0055117 A1 | 2/2015 | Pennecot et al. |
| 2015/0069113 A1 | 3/2015 | Wang et al. |
| 2015/0097947 A1 | 4/2015 | Hudman et al. |
| 2015/0103358 A1 | 4/2015 | Flascher |
| 2015/0109603 A1 | 4/2015 | Kim et al. |
| 2015/0123995 A1 | 5/2015 | Zavodny et al. |
| 2015/0131080 A1 | 5/2015 | Retterath et al. |
| 2015/0160341 A1 | 6/2015 | Akatsu et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0260843 A1 | 9/2015 | Lewis |
| 2015/0276923 A1 | 10/2015 | Song et al. |

(56) References Cited

U.S. PATENT DOCUMENTS

| | | | |
|---|---|---|---|
| 2015/0311673 A1 | 10/2015 | Wang et al. |
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1* | 1/2016 | Gilliland ............... G01S 7/4816 356/5.01 |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0026624 A1 | 9/2016 | Gilliland et al. |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1 | 10/2016 | Hjelmstad |
| 2016/0306358 A1 | 10/2016 | Kang et al. |
| 2016/0335778 A1 | 11/2016 | Smits |
| 2016/0348636 A1 | 12/2016 | Ghosh et al. |
| 2017/0003392 A1 | 1/2017 | Bartlett et al. |
| 2017/0026633 A1 | 1/2017 | Riza |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0030773 A1 | 10/2017 | Donovan |
| 2017/0285169 A1 | 10/2017 | Holz |
| 2017/0289524 A1 | 10/2017 | Pacala et al. |
| 2017/0299722 A1 | 10/2017 | Gong et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1* | 2/2018 | Jarosinski ............. G01S 7/4863 |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Von Novak et al. |
| 2018/0107221 A1 | 4/2018 | Droz et al. |
| 2018/0113200 A1* | 4/2018 | Steinberg ................ G01S 17/89 |
| 2018/0113208 A1 | 4/2018 | Bergeron et al. |
| 2018/0120441 A1 | 5/2018 | Elooz et al. |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0164408 A1 | 6/2018 | Hall et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shue et al. |
| 2018/0269646 A1 | 9/2018 | Welford et al. |
| 2018/0275248 A1 | 9/2018 | Bailey et al. |
| 2018/0284244 A1 | 10/2018 | Russell et al. |
| 2018/0299552 A1 | 10/2018 | Shu et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Eichenholz et al. |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1* | 1/2019 | Pacala ............... H01L 31/02027 |
| 2019/0018115 A1 | 1/2019 | Schmitt et al. |
| 2019/0036308 A1 | 1/2019 | Carson et al. |
| 2019/0049097 A1 | 2/2019 | Rossi et al. |
| 2019/0049662 A1 | 2/2019 | Thomsen et al. |
| 2019/0056497 A1 | 2/2019 | Pacala et al. |
| 2019/0064355 A1 | 2/2019 | Pacala et al. |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2019/0302246 A1 | 10/2019 | Donovan et al. |
| 2020/0018835 A1 | 1/2020 | Pei et al. |
| 2020/0041614 A1 | 2/2020 | Donovan et al. |
| 2020/0081101 A1 | 3/2020 | Donovan |
| 2020/0124711 A1 | 4/2020 | Rek et al. |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2020/0408908 A1 | 12/2020 | Donovan |
| 2021/0033708 A1 | 2/2021 | Fabiny |
| 2021/0041567 A1 | 2/2021 | Milgrome et al. |
| 2021/0124960 A1 | 4/2021 | Lee et al. |
| 2021/0157000 A1 | 5/2021 | Imaki |
| 2021/0181311 A1 | 6/2021 | Donovan |
| 2021/0231779 A1 | 7/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |
| 2022/0036521 A1 | 11/2022 | Donovan et al. |

FOREIGN PATENT DOCUMENTS

| | | |
|---|---|---|
| CN | 101080733 A | 11/2007 |
| CN | 101545582 A | 9/2009 |
| CN | 103633557 A | 3/2014 |
| CN | 104898125 A | 9/2015 |
| CN | 105705964 A | 6/2016 |
| CN | 106464366 A | 2/2017 |
| CN | 109073757 A | 12/2018 |
| CN | 107728156 B | 11/2019 |
| CN | 110402398 A | 11/2019 |
| CN | 110914702 A | 3/2020 |
| CN | 111356934 A | 6/2020 |
| CN | 111919137 A | 11/2020 |
| CN | 112543875 A | 3/2021 |
| CN | 113692540 A | 11/2021 |
| CN | 113906316 A | 1/2022 |
| CN | 113924506 A | 1/2022 |
| CN | 114096882 A | 2/2022 |
| CN | 114174869 A | 3/2022 |
| DE | 197 17 399 A1 | 6/1999 |
| DE | 10103861 A1 | 8/2001 |
| DE | 102007004609 A1 | 8/2007 |
| DE | 102014216390 A1 | 2/2016 |
| DE | 102019005059 A1 | 2/2020 |
| EP | 1160540 A1 | 12/2001 |
| EP | 1444696 B1 | 3/2005 |
| EP | 1569007 A2 | 8/2005 |
| EP | 2656099 A1 | 12/2011 |
| EP | 2656106 A1 | 12/2011 |

(56) References Cited

FOREIGN PATENT DOCUMENTS

| | | |
|---|---|---|
| EP | 2775316 A2 | 9/2014 |
| EP | 3168641 B1 | 4/2016 |
| EP | 3497477 A1 | 8/2016 |
| EP | 2656100 A1 | 10/2016 |
| EP | 3526625 A1 | 11/2016 |
| EP | 3 159 711 A1 | 4/2017 |
| EP | 3446153 A2 | 2/2019 |
| EP | 3596492 A1 | 1/2020 |
| EP | 3658949 A1 | 6/2020 |
| EP | 3710855 A2 | 9/2020 |
| EP | 3775979 A1 | 2/2021 |
| EP | 3830602 A1 | 6/2021 |
| EP | 3953727 A1 | 2/2022 |
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |
| JP | 5-243552 A | 9/1993 |
| JP | 7-253460 | 10/1995 |
| JP | 8-280173 A | 10/1996 |
| JP | 10-126007 A | 5/1998 |
| JP | 2000-147604 A | 5/2000 |
| JP | 2002-214361 A | 7/2002 |
| JP | 2003-258359 A | 9/2003 |
| JP | 2003-536061 | 12/2003 |
| JP | 2004-078255 A | 3/2004 |
| JP | 2004-94115 | 3/2004 |
| JP | 2004-361315 A | 12/2004 |
| JP | 2005-331273 A | 12/2005 |
| JP | 2006-162386 A | 6/2006 |
| JP | 2007-214564 | 8/2007 |
| JP | 2008-015434 A | 1/2008 |
| JP | 4108478 B2 | 6/2008 |
| JP | 2008-180719 A | 8/2008 |
| JP | 2009-103529 | 5/2009 |
| JP | 2009-170870 A | 7/2009 |
| JP | 2009-204691 | 9/2009 |
| JP | 2010-91855 | 4/2010 |
| JP | 2010-256291 A | 11/2010 |
| JP | 2011-003748 A | 1/2011 |
| JP | 2012-504771 A | 2/2012 |
| JP | 5096008 B2 | 12/2012 |
| JP | 2013-050310 A | 3/2013 |
| JP | 2013-113669 A | 6/2013 |
| JP | 2014-059302 A | 4/2014 |
| JP | 2014-077658 A | 5/2014 |
| JP | 2016-146417 | 8/2016 |
| JP | 2016-176721 A | 10/2016 |
| JP | 2016-188808 A | 11/2016 |
| JP | 2016-540189 A | 12/2016 |
| JP | 2017-053833 A | 3/2017 |
| JP | 2017-134814 A | 8/2017 |
| JP | 2018-025632 A | 2/2018 |
| JP | 2019-060652 A | 4/2019 |
| JP | 2019-68528 A | 4/2019 |
| JP | 2019-509474 A | 4/2019 |
| JP | 2019-516101 A | 6/2019 |
| JP | 2020-510208 A | 4/2020 |
| JP | 2021-503085 A | 2/2021 |
| JP | 2021-507260 A | 2/2021 |
| JP | 6839861 B2 | 3/2021 |
| JP | 6865492 B2 | 4/2021 |
| JP | 2021-073462 A1 | 5/2021 |
| JP | 2021-73473 A1 | 5/2021 |
| JP | 2021-105613 A | 7/2021 |
| JP | 2021-519926 A | 8/2021 |
| JP | 2021-139918 A | 9/2021 |
| JP | 2021-532368 A | 11/2021 |
| JP | 2022-1885 A | 1/2022 |
| JP | 6995413 B2 | 1/2022 |
| JP | 2022-22361 A1 | 2/2022 |
| JP | 2022-36224 A | 3/2022 |
| JP | 7037830 B2 | 3/2022 |
| JP | 2022-526998 A | 5/2022 |
| JP | 2022-534500 A | 8/2022 |
| KR | 10-2000-0053620 A | 8/2000 |
| KR | 10-2009-0016499 A | 2/2009 |
| KR | 10-2012-0053045 A | 5/2012 |
| KR | 10-2012-0061033 A | 6/2012 |
| KR | 10-2013-0140554 A | 12/2013 |
| KR | 10-2014-0138724 A | 12/2014 |
| KR | 10-2015-0045735 A | 4/2015 |
| KR | 10-2016-0101140 A | 8/2016 |
| KR | 10-2018-0049937 A | 5/2018 |
| KR | 10-2018-0064969 A | 6/2018 |
| KR | 10-2018-0128447 A | 12/2018 |
| KR | 10-2019-0076725 A | 7/2019 |
| KR | 10-2019-0117418 A | 10/2019 |
| KR | 10-2019-0120403 A | 10/2019 |
| KR | 10-2020-0011351 A | 2/2020 |
| KR | 10-2020-0075014 A | 6/2020 |
| KR | 10-2020-0096632 A | 8/2020 |
| KR | 10-2020-0128435 A | 11/2020 |
| KR | 10-2021-0021409 A | 2/2021 |
| KR | 10-2218679 B1 | 2/2021 |
| KR | 10-2021-0029831 A | 3/2021 |
| KR | 10-2021-0065207 A | 6/2021 |
| KR | 10-2021-0092212 A | 7/2021 |
| KR | 10-2021-0137584 A | 11/2021 |
| KR | 10-2021-0137586 A | 11/2021 |
| KR | 10-2326493 B1 | 11/2021 |
| KR | 10-2326508 B1 | 11/2021 |
| KR | 10-2022-0003600 A | 1/2022 |
| KR | 10-2022-0017412 A | 2/2022 |
| KR | 10-2364531 B1 | 2/2022 |
| KR | 10-2022-0024177 A | 3/2022 |
| KR | 10-2022-0025924 A | 3/2022 |
| KR | 10-2022-0038691 A | 3/2022 |
| KR | 10-2398080 B1 | 5/2022 |
| WO | 99-42856 A1 | 8/1999 |
| WO | 2002/065153 A1 | 8/2002 |
| WO | 2006/044758 A2 | 4/2006 |
| WO | 2006/083349 A2 | 8/2006 |
| WO | 2013/107709 A1 | 7/2013 |
| WO | 2014/014838 A2 | 1/2014 |
| WO | 2015/040671 A1 | 3/2015 |
| WO | 2015040671 | 3/2015 |
| WO | 2015/059705 A1 | 4/2015 |
| WO | 2017/112416 A1 | 6/2017 |
| WO | 2017/132704 A1 | 8/2017 |
| WO | 2017/184336 A2 | 10/2017 |
| WO | 2018028795 A1 | 2/2018 |
| WO | 2018082762 A1 | 5/2018 |
| WO | 2018/169758 A1 | 9/2018 |
| WO | 2018166609 A1 | 9/2018 |
| WO | 2018166610 A1 | 9/2018 |
| WO | 2018166611 A1 | 9/2018 |
| WO | 2018169758 | 9/2018 |
| WO | 2018/180391 A1 | 10/2018 |
| WO | 2018/181250 A1 | 10/2018 |
| WO | 2018/191495 A1 | 10/2018 |
| WO | 2019/010320 A1 | 1/2019 |
| WO | 2019/022941 A1 | 1/2019 |
| WO | 2019-064062 A1 | 4/2019 |
| WO | 2019115148 A1 | 6/2019 |
| WO | 2019/195054 A1 | 10/2019 |
| WO | 2019/221776 A2 | 11/2019 |
| WO | 2020/028173 A1 | 2/2020 |
| WO | 2020/210176 A1 | 10/2020 |
| WO | 2020/242834 A1 | 12/2020 |
| WO | 2020/251891 A1 | 12/2020 |
| WO | 2020/263735 A1 | 12/2020 |
| WO | 2021/021872 A1 | 2/2021 |
| WO | 2021/150860 A1 | 7/2021 |
| WO | 2021/236201 A2 | 11/2021 |
| WO | 2022/103778 A1 | 5/2022 |

OTHER PUBLICATIONS

U.S. Appl. No. 16/028,774, filed Jul. 6, 2018, in the USPTO.
"Notification of Transmittal of The International Search Report and The Written Opinion of the International Searching Authority, or

(56) References Cited

OTHER PUBLICATIONS

The Declaration" for International Patent Application No. PCT/US2018/057026, dated Dec. 16, 2019, 11 pages, International Searching Authority, Korean Intellectual Property Office, Daejeon, Republic of Korea.
"Written Opinion of the International Searching Authority" for International Patent Application No. PCT/EP2016/077499, dated Feb. 14, 2017, 7 pages, The International Searching Authority.
"Search Report" for International Patent Application No. PCT/EP2016/077499, 2 pages, International Searching Authority/ EPO, Rijswijk, the Netherlands.
"Notification Concerning Transmittal of International Preliminary Report on Patentability (Chapter I of the Patent Cooperation Treaty)" for International Patent Application No. PCT/US2018/021553, dated Sep. 26, 2019, 9 pages, The International Bureau of WIPO, Geneva, Switzerland.
"Notification of Transmittal of The International Search Report and The Written Opinion of The International Searching Authority, or The Declaration" for International Patent Application No. PCT/US2018/041021, dated Nov. 5, 2018, 15 Pages, Korean Intellectual Property Office, Daejeon, Republic of Korea.
"European Search Report" For European Patent Application No. 17786325.5, dated Nov. 9, 2019, 18 pages, European Patent Office, Munich, Germany.
"Notification of Transmittal of the International Search Report and the Written Opinion of the International Searching Authority, or the Declaration" for International Patent Application No. PCT/US2019/043674, dated Nov. 15, 2019, 16 pages, International Searching Authority/KR, Daejeon, Republic of Korea.
"Supplementary European Search Report" for European Patent Application No. EP17786325, dated Mar. 11, 2020, 22 pages, European Patent Office, Munich, Germany.
Notification of Transmittal of the International Search Report and the Written Opinion of the International Searching Authority, or the Declaration for International Patent Application No. PCT/US2019/024343, dated Jul. 12, 2019, 17 Pages, SA/KR, Korean Intellectual Property Office, Daejeon, Republic of Korea.
"Notification Concerning Transmittal of International Preliminary Report on Patentability (Chapter I of the Patent Cooperation Treaty)" for PCT/US2018/057026, dated May 28, 2020, 7 pages, The International Bureau of WIPO, Geneva, Switzerland.
"Search Report" for European Patent Application No. 18918938.4, dated Jul. 6, 2021, 9 pages, European Patent Office, Munich, Germany.
"Notice of Preliminary Rejection" for Korean Patent Application 10-2020-7016928, dated Jul. 16, 2021, 6 pages, Korean ntellectual Property Office, Daejeon, South Korea.
Decision to Grant a Patent received for Korean Patent Application Serial No. 10-2020-7016928 dated Nov. 16, 2021, 3 pages (Including English Translation).
International Preliminary Report on Patentability received for PCT Application Serial No. PCT/US2020/036634, dated Dec. 23, 2021, 6 pages.
International Search Report and Written Opinion received for PCT Application Serial No. PCT/US2021/058687, dated Mar. 3, 2022, 11 pages.
Decision to Grant a Patent received for Japanese Patent Application Serial No. 2021-014376, dated Mar. 22, 2022, 05 pages (2 pages of English Translation and 3 pages of Official Copy).
Non-Final Office Action received for U.S. Appl. No. 17/164,773, dated Apr. 21, 2022, 8 pages.
Notice of Allowance received for Chinese Patent Application Serial No. 201880047615.6, dated Mar. 23, 2022, 7 pages (2 pages of English Translation and 5 pages of Official Copy).
Decision to Grant a Patent received for Korean Patent Application Serial No. 10-2018-7030512, dated Mar. 18, 2022, 3 pages (1 page of English Translation and 2 pages of Official Copy).
Decision to Grant a Patent received for Korean Patent Application Serial No. 10-2021-7036648, dated May 19, 2022, 3 pages (1 page of English Translation and 2 pages of Official Copy).
Decision to Grant a Patent received for Japanese Patent Application Serial No. 2019-549550, dated Feb. 25, 2022, 5 pages (2 pages of English Translation and 3 pages of Official Copy).
Office Action for Japanese Patent Application No. 2021-020502, dated Apr. 13, 2022, 10 pages (7 pages of English Translation and 3 pages of Official Copy).
Notice of Allowance received for U.S. Appl. No. 17/227,300, dated Feb. 8, 2022, 11 pages.
International Search Report and Written Opinion received for PCT Application Serial No. PCT/US2021/020749, dated Jan. 3, 2022, 11 pages.
International Preliminary Report on Patentability received for PCT Application Serial No. PCT/US2020/038927, dated Jan. 6, 2022, 9 pages.
Office Action received for Korean Application Serial No. 10-2020-7029872, dated Jan. 19, 2022, 32 pages (18 pages of English Translation and 14 pages of Official Copy).
Extended European Search Report received for European Patent Application Serial No. 19843301.3, dated Feb. 18, 2022, 10 pages.
International Preliminary Report on Patentability received for PCT Application Application No. PCT/US2020/043979, dated Feb. 10, 2022, 06 pages.
Office Action received for Korean Application Serial No. 10-2020-7029872, dated May 24, 2022, 05 pages (2 pages of English Translation and 3 pages of Official Copy).
Notice of Allowance received for Korean Patent Application Serial No. 10-2021-7006391, dated Feb. 9, 2022 03 pages (1 page of English Translation and 2 pages of Official Copy).
Restriction Requirement received for U.S. Appl. No. 16/366,729, dated Jun. 3, 2022, 06 pages.
Office Action received for Japanese Patent Application Serial No. 2021-100687, dated Jul. 1, 2022, 09 pages. (6 pages of English Translation and 3 pages of Official Copy).
Restriction Requirement received for U.S. Appl. No. 16/523,459, dated Jun. 16, 2022, 05 pages.
Notice of Allowance received for U.S. Appl. No. 16/841,930, dated Jun. 29, 2022, 10pages.
Non-Final Office Action received for U.S. Appl. No. 16/878,140, dated Jun. 22, 2022, 24 pages.
Non-Final Office Action received for U.S. Appl. No. 16/907,732, dated Jul. 13, 2022, 20 pages.
International Preliminary Report on Patentability received for PCT Application Serial No. PCT/US2021/014564, dated Aug. 4, 2022, 06 pages.
Notice of Allowance received for U.S. Appl. No. 16/895,588, dated Aug. 3, 2022, 9 pages.
Non-Final Office Action received for U.S. Appl. No. 16/366,729, dated Aug. 26, 2022, 09 pages.
Notice of Allowance received for U.S. Appl. No. 16/805,733, dated Aug. 22, 2022, 13 pages.
Office Action received for Japanese Patent Application Serial No. 2021-0168642, dated Aug. 25, 2022, 4 pages (2 pages of English Translation and 2 pages of Official Copy).
Office Action received for Japanese Patent Application Serial No. 2020-526502, dated Aug. 24, 2022, 10 pages (5 pages of English Translation and 5 pages of Official Copy).
Office Action received for European Patent Application No. 17786325.5, dated Dec. 17, 2021, 5 pages.
Office Action received for Korean Patent Application No. 10-2018-7030512, dated Dec. 23, 2021, 7 pages. (3 pages of English Translation and 4 pages of Official Copy).
Non-Final Office Action received for U.S. Appl. No. 15/456,789, dated Sep. 25, 2019, 10 pages.
Notice of Allowance received for U.S. Appl. No. 15/456,789, dated Apr. 29, 2020, 5 pages.
Non-Final Office Action received for U.S. Appl. No. 15/915,840, dated May 7, 2020, 11 pages.
Notice of Allowance received for U.S. Appl. No. 15/915,840, dated Jan. 19, 2021, 6 pages.
Extended European Search Report received for European Patent Application No. 18767885.9, dated Nov. 18, 2020, 10 pages.

(56) References Cited

OTHER PUBLICATIONS

Office Action received for Japanese Patent Application No. 2019-549550, dated Mar. 22, 2021, 6 pages (3 pages of English Translation and 3 pages of Official Copy).
Office Action received for Korean Patent Application No. 10-2019-7029980, dated Mar. 26, 2021, 6 pages (3 pages of English Translation and 3 pages of Official Copy).
Plant, et al., "256-Channel Bidirectional Optical Interconnect Using VCSELs and Photodiodes on CMOS", Journal of Lightwave Technology, vol. 19, No. 8, Aug. 2001, pp. 1093-1103.
Knodl, et al., "Bipolar Cascade VCSEL with 130% Differential Quantum Efficiency", Annual Report 2000, Optoelectronics Department, pp. 11-14.
Morgan, et al., "Two-Dimensional Matrix Addressed Vertical Cavity Top-Surface Emitting Laser Array Display", IEEE Photonics Technology Letters, vol. 6, No. 8, Aug. 1994, pp. 913-917.
Orenstein, et al., "Matrix Addressable Vertical Cavity Surface Emitting Laser Array", Electronics Letters, vol. 27, No. 5, Feb. 28, 1991, pp. 437-438,.
Geib, et al., "Fabrication and Performance of Two-Dimensional Matrix Addressable Arrays of Integrated Vertical-Cavity Lasers and Resonant Cavity Photodetectors", IEEE Journal of Selected Topics In Quantum Electronics, vol. 8, No. 4, Jul./Aug. 2002, pp. 943-947.
Moench et al., "VCSEL Based Sensors for Distance and Velocity", Vertical Cavity Surface-Emitting Lasers XX, Proc. of SPIE, vol. 9766, 2016, pp. 97660A-1- 97660A-11.
Notice of Allowance received for Korean Patent Application No. 10-2019-7029980, dated Aug. 6, 2021, 3 pages (1 page of English Translation and 2 pages of Official Copy). English Translation).
Office Action received for Japanese Patent Application No. 2019-549550, dated Aug. 27, 2021, 7 pages (5 pages of English Translation and 2 pages of Official Copy).
Notice of Allowance received for U.S. Appl. No. 16/028,774, dated Aug. 21, 2019, 10pages.
Non-Final Rejection received for U.S. Appl. No. 16/686,163, dated Apr. 16, 2020, 9 pages.
Notice of Allowance received for U.S. Appl. No. 16/686,163, dated Oct. 16, 2020, 9 pages.
Office Action received for Korean Patent Application No. 10-2020-7005082, dated May 8, 2020, 19 pages (11 pages of English Translation and 8 pages of Official Copy).
Office Action received for Japanese Patent Application No. 2020-504014, dated Sep. 2, 2020, 7 pages (3 pages of English Translation and 4 pages of Official Copy).
Notice of Grant received for Korean Patent Application No. 10-2020-7005082, dated Nov. 24, 2020, 5 pages (3 pages of English Translation and 2 pages of Official Copy).
Office Action received for Chinese Patent Application No. 201880047615.6, dated Jan. 18, 2021, 16 pages (8 pages of English Translation and 8 pages of Official Copy).
Notice of Allowance received for Japanese Patent Application No. 2020-504014, dated Feb. 15, 2021, 5 pages (2 pages of English Translation and 3 pages of Official Copy).
Extended European Search Report received for European Patent Application No. 18839499.3, dated Mar. 4, 2021, 10 pages.
Office Action received for Korean Patent Application No. 10-2021-7004589, dated Mar. 10, 2021, 9 pages (5 pages of English Translation and 4 pages of Official Copy).
Office Action received for Japanese Patent Application No. 2021-056628, dated Jun. 14, 2021, 6 pages (3 pages of English Translation and 3 pages of Official Copy).
Notice of Allowance received for Korean Patent Application No. 10-2021-7004589, dated Aug. 6, 2021, 2 pages (1 page of English Translation and 1 page of Official Copy).
Office Action received for Chinese Patent Application Serial No. 201880047615.6, dated Aug. 25, 2021, 12 pages (6 pages of English Translation and 6 pages of Official Copy).
Notice of Allowance received for Japanese Patent Application Serial No. 2021-056628, dated Nov. 2, 2021, 5 pages (2 pages of English Translation and 3 pages of Official Copy).
International Search Report and Written Opinion received for PCT Patent Application No. PCT/US2017/026109, dated Jun. 19, 2017, 15 pages.
International Search Report and Written Opinion received for PCT Patent Application No. PCT/US2018/021553, dated Jun. 20, 2018, 13 pages.
International Preliminary Report on Patentability received for PCT Patent Application No. PCT/US2017/026109, dated Nov. 1, 2018, 13 pages.
Notice of Allowance received for Japanese Patent Application No. 2018-555665, dated Dec. 2, 2020, 05 pages (2 pages of English Translation and 3 pages of Official Copy).
International Preliminary Report on Patentability for International Patent Application No. PCT/US2019/024343, dated Oct. 15, 2020, 9 pages.
Office Action received for Korean Patent Application No. 10-2020-7029872, dated Jul. 19, 2021, 23 pages (13 pages of English Translation and 10 pages of Official Copy).
Extended European Search Report received for European Patent Application Serial No. 19781037.7, dated Oct. 25, 2021, 9 pages.
Office Action received for Korean Patent Application No. 10-2021-7006391, dated May 14, 2021, 17 pages (9 pages of English Translation and 8 pages of Official Copy).
International Preliminary Report on Patentability received for PCT Application Serial No. PCT/US2019/043674, dated Feb. 18, 2021, 10 pages.
International Search Report and Written Opinion received for International Patent Application No. PCT/US2020/026964, dated Jul. 28, 2020, 8 pages.
International Preliminary Report on Patentability received for PCT Patent Application No. PCT/US2020/026964, dated Oct. 21, 2021, 7 pages.
Non-Final Office Action received for U.S. Appl. No. 17/227,300, dated Jun. 30, 2021, 8 pages.
International Search Report and the Written Opinion received for PCT Patent Application No. PCT/US2020/033630, dated Sep. 9, 2020, 9 pages.
International Search Report and the Written Opinion received for PCT Patent Application No. PCT/US2020/036634, dated Sep. 21, 2020, 7 pages.
International Search Report and the Written Opinion received for PCT Patent Application No. PCT/US2020/038927, dated Oct. 7, 2020, 12 pages.
International Search Report and the Written Opinion received for PCT Patent Application No. PCT/US2020/043979, dated Nov. 10, 2020, 7 pages.
International Search Report and the Written Opinion received for PCT Patent Application No. PCT/US2021/014564, dated May 17, 2021, 8 pages.
Office Action received for Korean Patent Application Serial No. 10-2021-7036648, dated Dec. 17, 2021, 8 pages (4 pages of English Translation and 4 pages of Official Copy).
Office Action received for Japanese Patent Application No. 2021-014376, dated Sep. 27, 2021, 18 pages (12 pages of English Translation and 6 paegs of Official Copy).
International Preliminary Report on Patentability received for PCT Application Serial No. PCT/US2020/033630, dated Dec. 9, 2021, 8 pages.
Office Action received for Korean Patent Application Serial No. 10-2021-7006391, dated Oct. 22, 2021, 5 pages. (2 pages of English Translation and 3 pages of Official Copy).
Office Action received for Chinese Patent Application Serial No. 201780024892.0, dated Sep. 2, 2022, 28 pages (11 pages of English Translation and 17 pages of Official Copy).
Extended European Search Report received in European Application No. 20787345.6, dated Dec. 5, 2022, 8 pages.
Final Office Action received for U.S. Appl. No. 16/878,140, dated Feb. 1, 2023, 26 pages.
Notice of Allowance received for U.S. Appl. No. 17/164,773, dated Feb. 1, 2023, 8 pages.
Notice of Allowance received for U.S. Appl. No. 16/841,930, dated Jan. 30, 2023, 9 pages.

(56) References Cited

OTHER PUBLICATIONS

Restriction Requirement received for U.S. Appl. No. 16/941,896, dated Jan. 24, 2023, 06 pages.
Partial European Search Report received for European Patent Application No. 22178999.3, dated Oct. 10, 2022, 22 pages.
Decision to Grant received for Korean Patent Application Serial No. 10-2022-7021139, dated Dec. 14, 2022, 3 pages (1 page of English Translation and 2 pages of Official Copy).
Office Action received for Japanese Patent Application No. 2021-020502, dated Jan. 23, 2023, 6 pages (4 pages of English Translation and 2 pages of Official Copy).
Office Action received for Korean Patent Application No. 10-2021-7016081, dated Oct. 25, 2022, 4 pages (2 pages of English Translation and 2 pages of Official Copy).
Office Action received for Japanese Patent Application Serial No. 2021-199077, dated Dec. 23, 2022, 9 pages (6 pages of English Translation and 3 pages of Official Copy).
Office Action received for Korean Patent Application No. 10-2022-7028820, dated Dec. 15, 2022, 12 pages (6 pages of English Translation and 6 pages of Official Copy).
Extended European Search Report received for European Patent Application No. 20815113.4, dated Jan. 31, 2023, 14 pages.
Partial European Search Report received for European Patent Application No. 20822328.9, dated Feb. 6, 2023, 20 pages.
Office Action received for Korean Patent Application No. 10-2022-7004969, dated Jan. 9, 2023, 11 pages (6 pages of English Translation and 5 pages of Official Copy).
Office Action received for Japanese Patent Application Serial No. 2020-552870, dated Nov. 29, 2022, 11 pages (7 pages of English Translation and 4 pages of Official Copy).
Office Action received for Japanese Patent Application Serial No. 2022-002790, dated Dec. 26, 2022, 10 pages (7 pages of English Translation and 3 pages of Official Copy).
Decision to Grant received for Korean Patent Application Serial No. 10-2020-7029872, dated Nov. 28, 2022, 3 pages (1 page of English Translation and 2 pages of Official Copy).
Office Action received for Korean Patent Application No. 10-2022-7015754, dated Dec. 12, 2022, 21 pages (11 pages of English Translation and 10 pages of Official Copy).
Non-Final Office Action received for U.S. Appl. No. 17/227,295, dated Mar. 9, 2023, 10 pages.
Notice of Allowance received for U.S. Appl. No. 16/366,729, dated Mar. 8, 2023, 7 pages.
Extended European Search Report received for European Patent Application No. 22178999.3, dated Mar. 6, 2023, 25 pages.
International Search Report and the Written Opinion received for PCT Patent Application No. PCT/US2022/019054, dated Feb. 20, 2023, 13 pages.
Office Action received for Korean Application Serial No. 10-2021-7036300, dated Feb. 9, 2023, 14 pages (7 pages of English Translation and 7 pages of Official Copy).
Decision to Grant received for Korean Patent Application Serial No. 10-2021-7040665, dated Feb. 23, 2023, 3 pages (1 page of English Translation and 2 pages of Official Copy).
Office Action received for Chinese Patent Application Serial No. 201880017776.0, dated Feb. 16, 2023, 22 pages (10 pages of English Translation and 12 pages of Official Copy).
Office Action received for Chinese Patent Application Serial No. 201880074279.4, dated Mar. 1, 2023, 23 pages (9 pages of English Translation and 14 pages of Official Copy).
International Search Report and the Written Opinion received for PCT Patent Application No. PCT/US2022/028297, dated Mar. 13, 2023, 11 pages.
Notice of Allowance received for U.S. Appl. No. 17/164,773, dated Apr. 5, 2023, 8 pages.
Office Action received for Japanese Patent Application Serial No. 2021-100687, dated Mar. 14, 2023, 05 pages. (3 pages of English Translation and 2 pages of Official Copy).
Office Action received for Japanese Patent Application No. 2020-526502, dated Mar. 14, 2023, 8 pages (5 pages of English Translation and 3 pages of Official Copy).
Office Action received for Japanese Patent Application No. 2021-168642, dated Mar. 15, 2023, 5 pages (3 pages of English Translation and 2 pages of Official Copy).
Office Action received for Japanese Patent Application No. 2022-80688, dated Mar. 17, 2023, 11 pages (7 pages of English Translation and 4 pages of Official Copy).
Non-Final Office Action received for U.S. Appl. No. 17/155,626, dated Apr. 12, 2023, 24 pages.
Notice of Allowance received for U.S. Appl. No. 16/841,930, dated Apr. 17, 2023, 9 pages.
Final Office Action received for U.S. Appl. No. 16/523,459, dated Apr. 14, 2023, 13 pages.
Notice of Allowance received for U.S. Appl. No. 16/805,733, dated Jan. 25, 2023, 5 pages.
Notice of Allowance received for U.S. Appl. No. 16/805,733, dated May 8, 2023, 5 pages.
Office Action received for Korean Patent Application No. 10-2023-7007292, dated Apr. 17, 2023, 19 pages (10 pages of English Translation and 9 pages of Official Copy).
Decision to Grant a Patent received for Korean Patent Application Serial No. 10-2023-7009114, dated May 16, 2023, 3 pages (1 page of English Translation and 2 pages of Official Copy).
Office Action for Japanese Patent Application No. 2021-572877, dated May 12, 2023, 12 pages (8 pages of English Translation and 4 pages of Official Copy).
Office Action received for Japanese Patent Application No. 2021-559434, dated May 26, 2023, 17 pages (11 pages of English Translation and 6 pages of Official Copy).
Extended European Search Report received for European Patent Application No. 20831915.2, dated Jun. 2, 2023, 9 pages.
International Preliminary Report on Patentability received for PCT Application Serial No. PCT/US2021/058687, dated May 25, 2023, 7 pages.
Notice of Allowance received for Chinese Patent Application Serial No. 201780024892.0, dated May 30, 2023, 2 pages (Official Copy Only).
Office Action received for Korean Patent Application No. 10-2022-7036873, dated Mar. 29, 2023, 22 pages (12 pages of English Translation and 10 pages of Official Copy).
Extended European Search Report received for European Patent Application No. 20822328.9, dated May 4, 2023, 34 pages.
Non-Final Office Action received for U.S. Appl. No. 16/523,459, dated Sep. 13, 2022, 11 pages.
International Preliminary Report on Patentability received for PCT Application Serial No. PCT/US2021/020749, dated Sep. 15, 2022, 8 pages.
Notice of Allowance received for U.S. Appl. No. 16/841,930, dated Oct. 3, 2022, 9 pages.
Notice of Allowance received for U.S. Appl. No. 16/805,733, dated Nov. 10, 2022, 5 pages.
Notice of Allowance received for U.S. Appl. No. 17/164,773, dated Nov. 2, 2022, 8 pages.
Non-Final Office Action received for U.S. Appl. No. 18/183,748, dated Jun. 12, 2023, 8 pages.
Notice of Allowance received for U.S. Appl. No. 16/366,729, dated Jun. 22, 2023, 6 pages.
Non-Final Office Action received for U.S. Appl. No. 16/941,896, dated Jun. 20, 2023, 15 pages.
Notice of Allowance received for Korean Patent Application No. 10-2023-7017732, dated Jun. 15, 2023, 3 pages (1 page of English Translation and 2 pages of Official Copy).
Notice of Allowance received for Japanese Patent Application No. 2021-020502, dated Jun. 30, 2023, 3 pages (Official Copy only).
International Search Report and Written Opinion received for PCT Patent Application No. PCT/US2023/062750, dated Jun. 13, 2023, 9 pages.
Notice of Allowance received for Korean Patent Application No. 10-2022-7004969, dated Jul. 7, 2023, 3 pages (1 page of English Translation and 2 pages of Official Copy).

* cited by examiner

NOISE ADAPTIVE SOLID-STATE LIDAR SYSTEM

The section headings used herein are for organizational purposes only and should not to be construed as limiting the subject matter described in the present application in any way.

CROSS REFERENCE TO RELATED APPLICATIONS

The present application is a non-provisional application of U.S. Provisional Patent Application No. 62/586,557, entitled "Noise Adaptive Solid-State LIDAR System" filed on Nov. 15, 2017. The entire contents of U.S. Provisional Patent Application No. 62/586,557 are herein incorporated by reference.

INTRODUCTION

Autonomous, self-driving, and semi-autonomous automobiles use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high resolution 3D mapping of the surrounding environment. To address the requirements of the increasingly complex array of automotive applications, LIDAR systems are required that have fast enough response time to respond to fast moving objects. LIDAR systems also must have sufficient signal-to-noise for the received signal to detect objects at distance. It is also desirable for LIDAR systems to have high reliability, with a minimum of moving parts.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
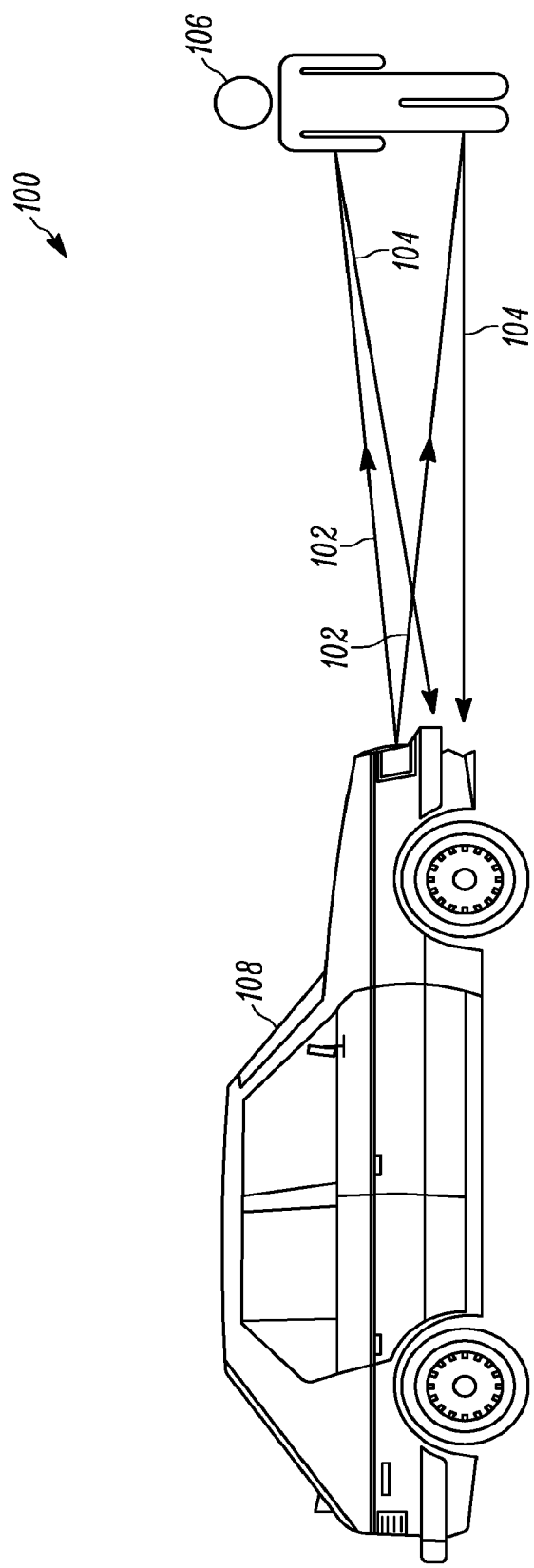
FIG. 1 illustrates an embodiment of a LIDAR system according to the present teaching that is implemented in a vehicle.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching can be performed in any order and/or simultaneously as long as the teaching remains operable. Furthermore, it should be understood that the apparatus and methods of the present teaching can include any number or all of the described embodiments as long as the teaching remains operable.

The present teaching relates to solid-state LIDAR systems that measure distances to various objects or targets that reflect and/or scatter light. In particular, the present teaching describes a noise-adaptive solid-state LIDAR system that enables reduction of the noise in the received measurement signal by reducing noise in the detected electrical signal. This results in improved SNR and thus longer measurement ranges.

Automotive applications require LIDAR systems with a measurement range exceeding 100 meters, to provide sufficient time for responding to fast moving objects. For example, two vehicles in opposite lanes on a non-divided highway might have an oncoming relative velocity of 250 km/h (150 mph) or more. At 250 km/h, it will only take 1.44 seconds to close a 100 meter gap between the two vehicles.

The Signal-to-Noise Ratio (SNR) of the received signal in a LIDAR system determines whether an object can be detected, at what distance, and at what error rate. Signal strength depends on the optical power transmitted, with higher transmit powers providing a stronger reflected return signal increasing the range. However, automotive LIDAR systems are typically constrained to have Class 1 laser eye safety standards, which limit the maximum allowable optical power that can be transmitted. By operating within Class 1 eye-safe standards, a product that emits laser light is considered eye-safe under all reasonably anticipated conditions of use. Once the Class 1 eye safety transmit optical power limit is reached, further improvements in the SNR must be achieved thru the optical receiver design and/or signal processing gains. It is also highly desired for automotive applications that a LIDAR system be completely solid-state with no moving parts, to maximize the reliability.

FIG. 1 illustrates the operation of a LIDAR system 100 of the present teaching implemented in a vehicle. The LIDAR system 100 includes a laser projector, also referred to as an illuminator, that projects light beams 102 generated by a light source toward a target scene and a receiver that receives the light 104 that reflects of an object, shown as a person 106, in that target scene. LIDAR systems typically also include a controller and/or system processor that computes the distance information about the object 106 from the reflected light, and an element that can scan or provide a particular pattern of the light that may be a static pattern across a desired range and field-of-view (FOV). The receiver, controller, and system processor are used to convert the received signal light into measurements that represent a pointwise 3D map of the surrounding environment that falls within the LIDAR system range and FOV. In various embodiments, the controller can be a simple electrical circuit or a more complicated processor, depending on the particular application.

The laser source and optical beam projection system that form the illuminator and the receiver may be located on the front side of a vehicle 108. The laser source and optical beam projection system may also be referred to as a transmitter. A person 106 and/or another object, such as a car or light pole, will provide light reflected from the source back to the receiver. A controller then determines the range or distance to that object. As is known in the art, a LIDAR receiver calculates range information based on time-of-flight measurements of light pulses emitted from the light source. In addition, known information about the optical beam profile that illuminates the scene in a target plane associated with a particular range and, based on the particular design of the source and projector system, is used to determine location information about the reflecting surface in order to generate a complete x,y,z, or three-dimensional picture of the scene. In other words, the pointwise 3D map of the surrounding environment represents a collection of measurement data that indicates position information from all the surfaces that reflect the illumination from the source to the receiver within the field-of-view of the LIDAR system. In this way, a 3D representation of objects in the field-of-view of the LIDAR system is obtained. The pointwise 3D data map may also be referred to as a measurement point cloud.

Figure 2:
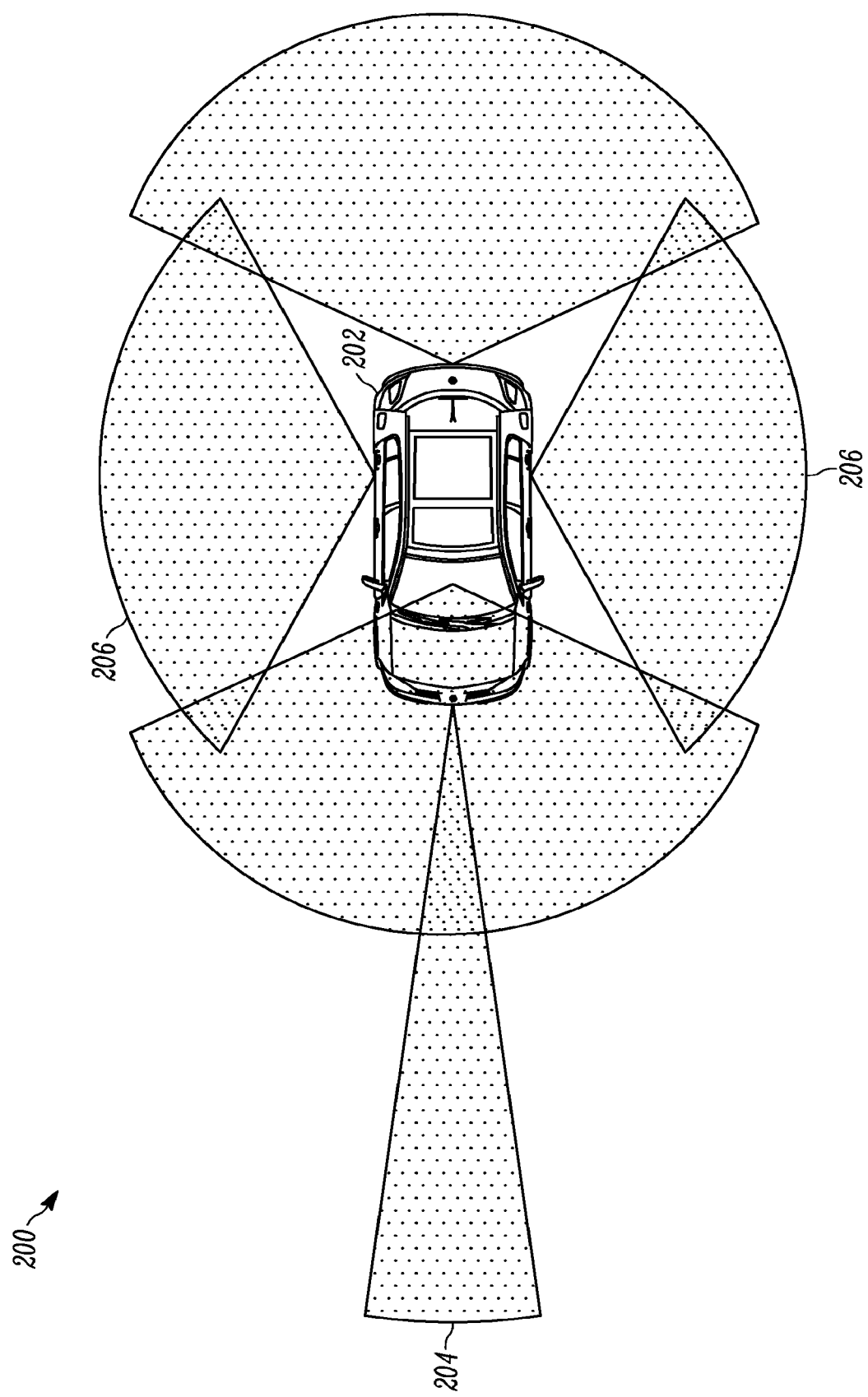
FIG. 2 illustrates a schematic diagram representing two-dimensional field-of-view and range requirements of an embodiment of a LIDAR sensing system for the surroundings of an automobile according to the present teaching.

FIG. 2 illustrates a schematic diagram representing two-dimensional field-of-view and range requirements of a typical surroundings sensing LIDAR system 200 for an automobile 202. For example, an adaptive cruise control function may require a field-of-view and range 204 with a narrow field-of-view, but with a longer-distance range requirement compared to the side looking "surround view" field-of-view and range 206. In general, sensor functions on an automobile may be enabled by a combination of LIDAR, radar, cameras, and ultrasonic sensors. The combining of these sensor data to generate information about the surrounding environment is often referred to as "sensor fusion".

Although the present teaching describes LIDAR systems in the context of automotive vehicles, where LIDAR is widely used for autonomous, or self-driving, or driver-assisted, vehicles, it should be understood that the embodiments may be applicable to any vehicle. Other types of vehicles might include robots, tractors, trucks, airplanes, drones, boats, ships, and others. The present teachings are also applicable to various stationary applications. For example, in high density, metropolitan areas, LIDAR could be employed to monitor traffic, both vehicular and pedestrian. We can expect to see LIDAR deployed in many different applications as the cost of the LIDAR systems come down over time. One skilled in the art will appreciate that the invention is not limited the types of objects being detected and ranged.

Figure 3:
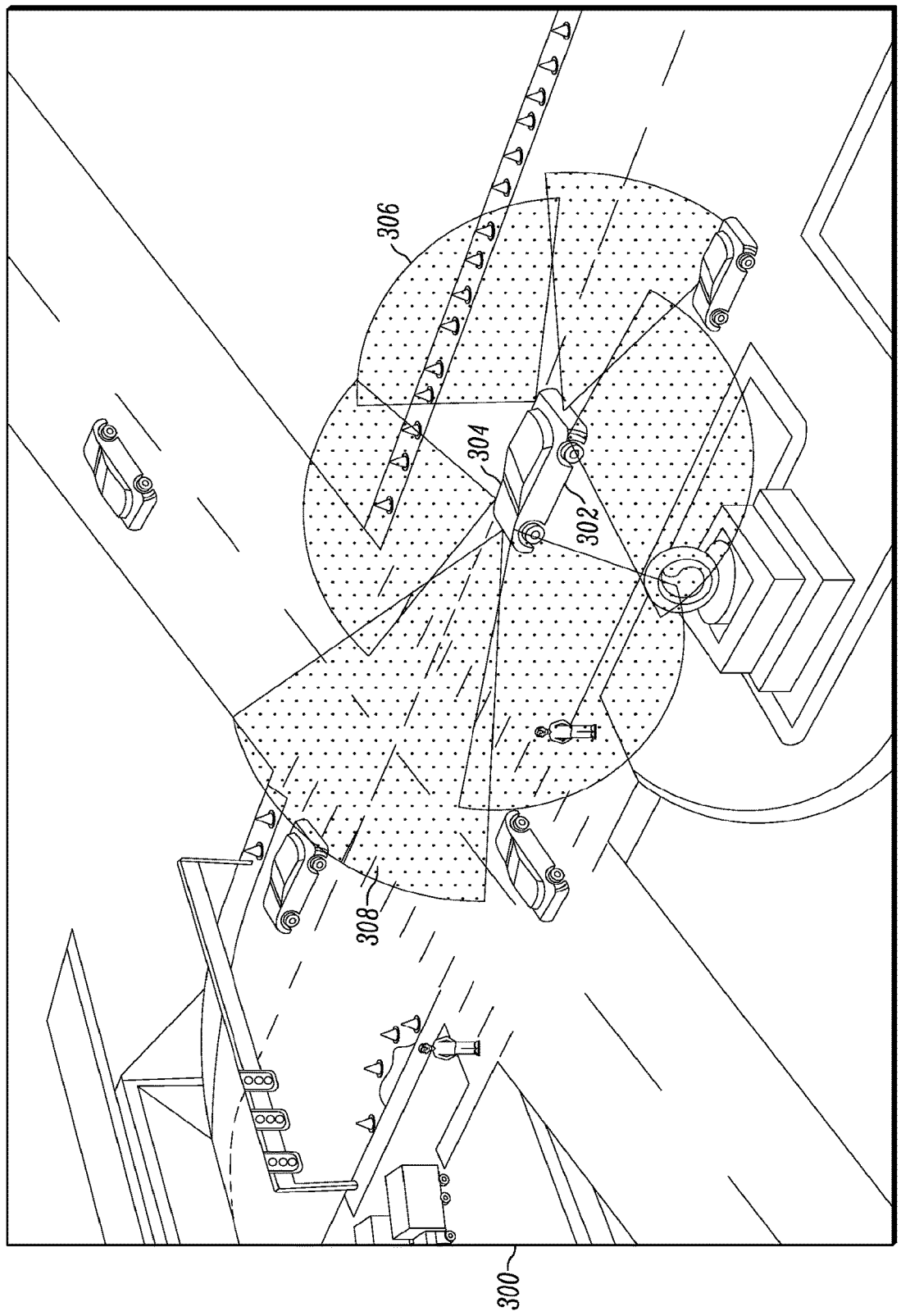
FIG. 3 illustrates an embodiment of a multi-module LIDAR sensor system of the present teaching.

FIG. 3 illustrates a sensor system 300 for an automobile 302 of the present teaching. There are six separate LIDAR modules 304 that operate with various ranges and fields-of-view, illustrated by the 2D wedges in the diagram. Four of the LIDAR modules 304 are predominantly side-view, and each have a range and field-of-view 306 of approximately 120 degrees. The forward module is shown with a range and field-of-view 308 that has the narrowest field-of-view and longest distance range.

Figure 4A:
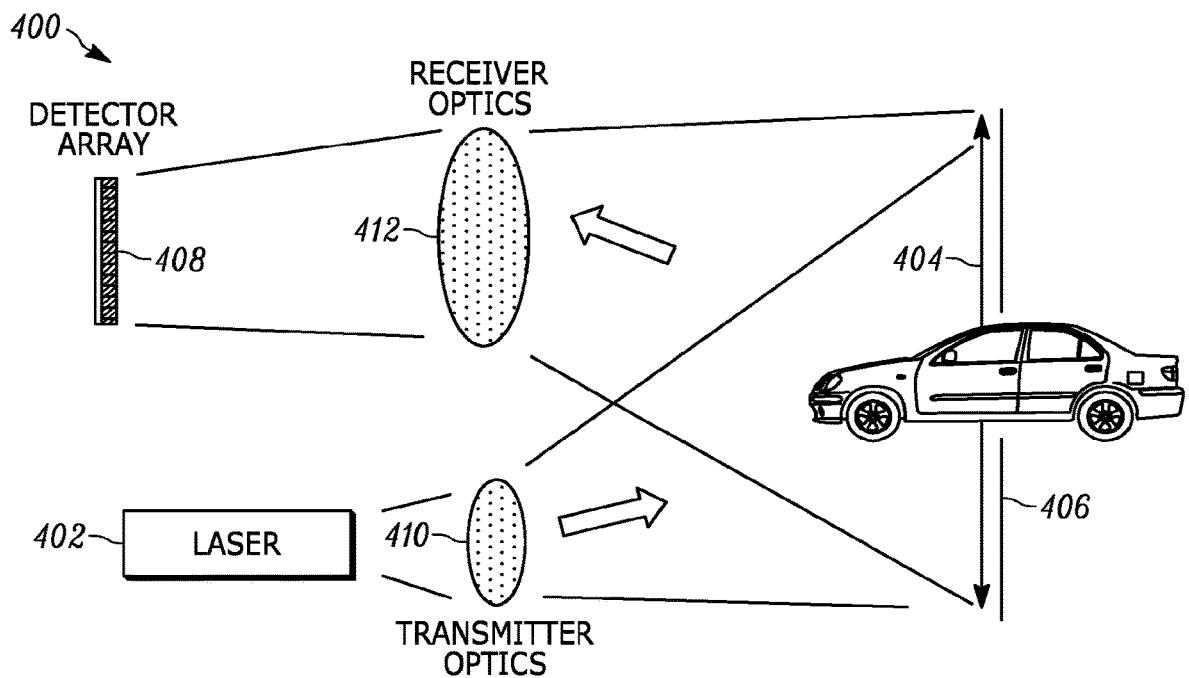
FIG. 4A illustrates a schematic diagram of a known 3D flash LIDAR system.
Figure 4B:
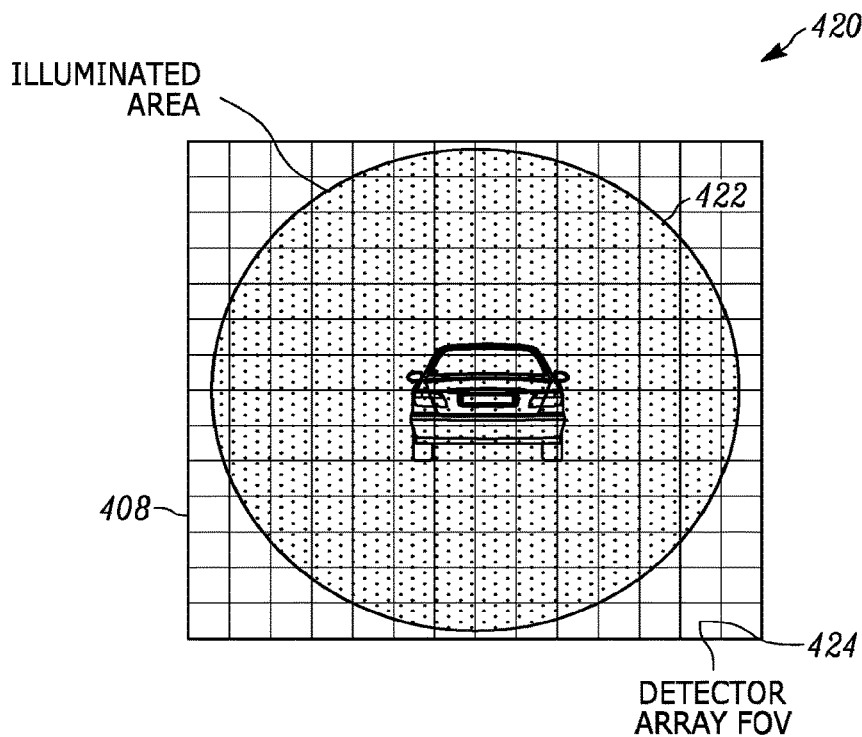
FIG. 4B illustrates a two-dimensional projection of the system field-of-view of the known 3D flash LIDAR system of FIG. 4A.

FIG. 4A illustrates a schematic diagram of a known 3D flash LIDAR system 400. In the flash LIDAR system 400, a high power laser 402 is used to illuminate the full transmitter field-of-view 404 in a single transmitted pulse that illuminates objects at a target range 406. The reflected light from objects at the target range is received by a focal plane array (FPA) 408 where each individual detector in the array 408 corresponds to a 3D measurement point. The array 408 is shown in side-view in FIG. 4A. As shown in FIG. 4A, the transmitter consists of a high power laser 402, combined with optics 410 that act to expand the beam and illuminate a desired field-of-view 404 at a target range 406. FIG. 4B illustrates a two-dimensional projection of the system field-of-view 420 of the known focal plane array 408 of FIG. 4A. The illuminated region is shown as a circular projection 422 over the array 408. Referring to both FIGS. 4A and 4B, the receiver consists of receiver optics 412 that form an image on the detector array 408, where each individual detector has a detector field-of-view shown as a square 424 and corresponding to an individual 3D measurement point. The field-of-view of the full detector array is represented by the total matrix of squares 424 in the diagram 620 shown in FIG. 6B. Diagram 620 shows that the field-of-view of the detector array 408 and the field-of-view of the transmitter, which is the circular projection 422 in the illumination region, are not necessarily the same shape and/or size.

Flash LIDAR has the advantage of typically being solid-state without any moving parts. Flash LIDAR also has the advantage that the transmitter and receiver optics can be optimized separately. One major disadvantage of flash LIDAR, however, is the high-power laser 402 required. It is difficult to maintain Class 1 eye safety with flash LIDAR, particularly at wavelengths in the 800-nm to 1,000-nm wavelength range, while still achieving a system capable of measuring out to a 100 plus meter target range. For eye safety reasons, flash LIDAR systems typically operate with a 1,550-nm wavelength, where human eyes have relatively low sensitivity. However, 1,550-nm wavelength transmitter and receiver components have comparatively higher cost.

A second disadvantage of a flash LIDAR system is the resolution of the 3D point cloud is determined solely by the detector array 408. The number of detectors (sometimes referred to as pixels) and the array size determines the measurement resolution. Very high-density detector arrays (in the thousands of elements) would be required to meet the angular resolution requirements for automotive LIDAR.

A third disadvantage of flash LIDAR is that all the individual detectors in the array 408 operate in parallel, similar to a camera. For a single high-power transmitter pulse, a measurement is simultaneously obtained with all detectors. Consequently, each detector must have its own circuitry for capturing the signal information, such as the TOF and amplitude data. The requirement that all pixels must work in parallel, results in the cost of the system scaling very rapidly with increasing pixel density. The refresh rate is also typically affected with larger pixel count leading to slower refresh rates.

Figure 5A:
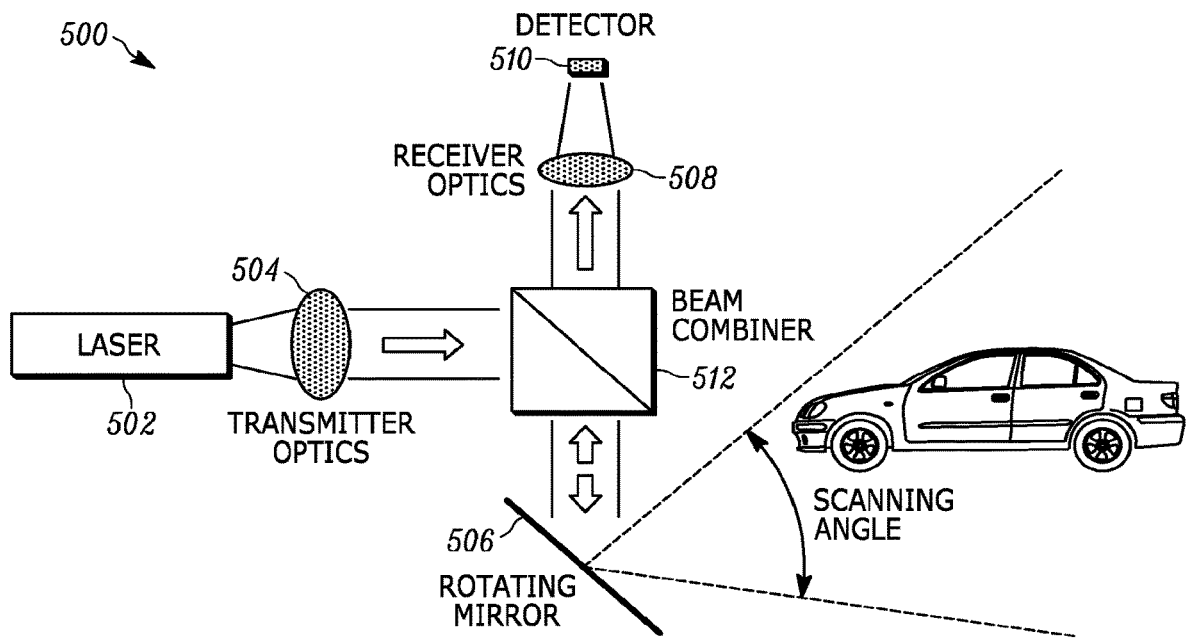
FIG. 5A illustrates a known LIDAR system using a mechanical scanning approach.

FIG. 5A illustrates a known LIDAR system 500 using a mechanical scanning approach. In a mechanical scanning LIDAR system, the laser beam emitted by a laser 502 is highly collimated by a set of transmitter optics 504 to obtain as small a beam divergence as practical. The highly collimated transmitter beam is directed to a rotating mirror 506 that reflects the transmitter beam and operates to scan the laser beam across the desired field-of-view.

Figure 5B:
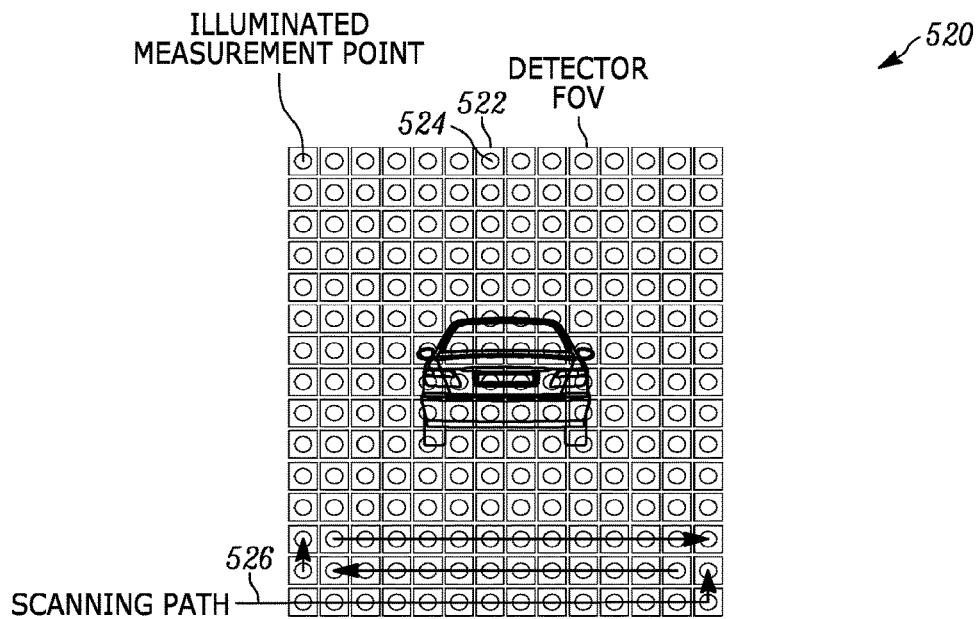
FIG. 5B illustrates a two-dimensional projection of the system field-of-view of the LIDAR system of FIG. 5A.

In the mechanical scanning LIDAR system 500 shown, the receiver system includes receive optics 508 and detector 510 that are configured to receive the reflected light from the mirror 506, such that the detector 510 also has a narrow field-of-view. In the schematic of FIG. 5A, a beam combiner 512 is used for spatially combining the transmitted and reflected light. FIG. 5B illustrates a two-dimensional projection of the system field-of-view 520 of the LIDAR system of FIG. 5A. Ideally, the detector field-of-view, which is represented as a small square 522 in the diagram, is just slightly larger than then the area illuminated by the collimated laser beam, represented as a small circle 524.

In the 2D projection of the system field-of-view 520, one example of a scanning path 526 is shown. Given the mechanical constraints associated with using a mirror 506, which is commonly implemented as a MEMS device, the scanning path 526 is a continuous curve sweeping first across one row, and then across the next row. Since physical motion of the mirror 506 is required, there is always some latency in moving between measurement points.

The mechanical scanning LIDAR system 500 has certain limitations imposed by the rotating mirror 506. The scanning speed will be a strong function of the mirror size, and in order to have high refresh rate, the size of that mirror is often <5 mm in diameter. The mirror size limits the collimation/divergence of the transmitter since the laser beam cannot be arbitrarily expanded in size, as any power outside the ~5 mm diameter will be lost and thus not transmitted to the target. On the receive side, since the receiver optics "look thru the mirror", the maximum clear aperture of the receiver is equivalent again to the size of the mirror 506. The amount of reflected light received within a 5-mm-diameter clear aperture may not be sufficient to reach the required 100 plus meter range even with single-photon detection, in some conditions, such as when the target has low-reflectivity and/or there are adverse weather conditions, such as rain, fog and/or snow. Also, there are long term reliability concerns for a mechanically based scanning LIDAR system 500 being used in the challenging automotive environment.

Figure 6A:
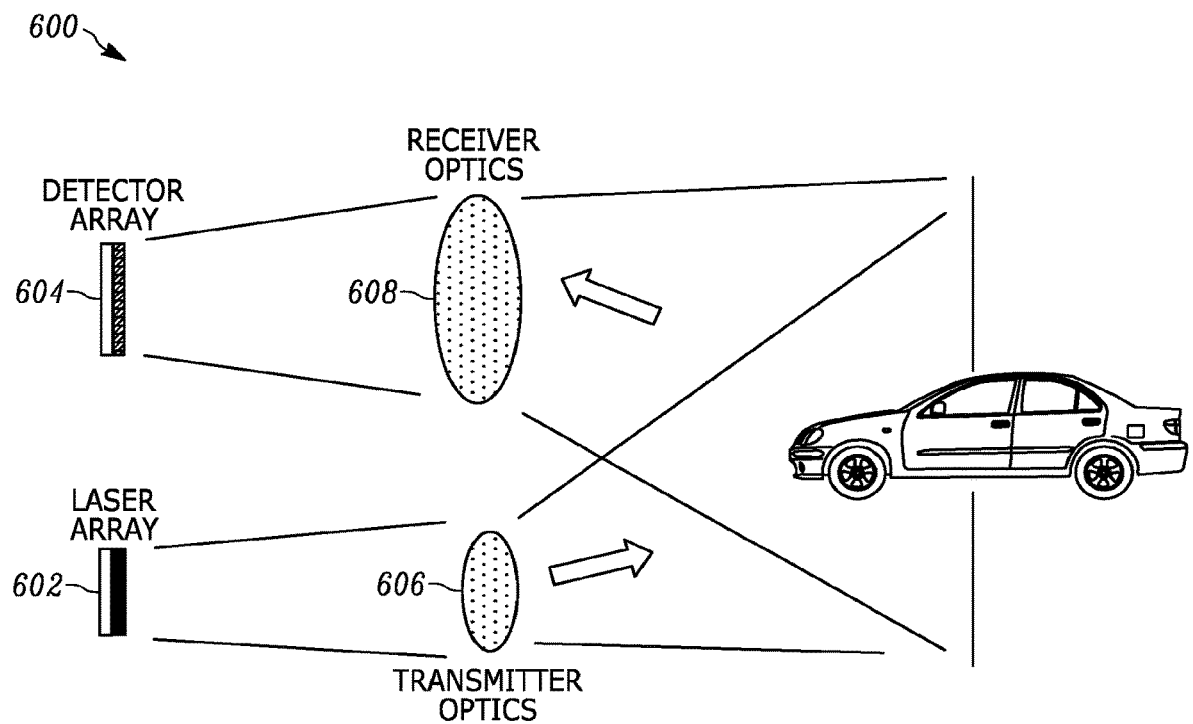
FIG. 6A illustrates an embodiment of a noise-adaptive solid state LIDAR system according to the present teaching.

FIG. 6A illustrates a schematic diagram of one embodiment of a noise adaptive solid-state LIDAR system 600 with no moving parts. In FIG. 6A, the transmitter is not a flash light source which illuminates the full system field-of-view all at once. Instead, the transmitter includes a laser array 602, wherein each laser in the array 602 can be fired independently, with the optical beam emitted by each laser in the array 602 corresponding to a single 3D measurement point. Each laser beam in the FIG. 6A transmitter is highly collimated and focused to correspond to a single measurement point, similar to the scanning system described in connection with FIG. 5A-B. In some embodiments, all of the light beams from the lasers in the laser array 602 share the transmitter optics 606 and the reflected light from the target range also shares the receiver optics 608. One example of such a transmitter is described in detail in U.S. Patent Publication No. 2017/0307736 A1, which is assigned to the present assignee. The entire contents of U.S. Patent Publication No. 2017/0307736 A1 are incorporated herein by reference.

One feature of the present teaching is that the laser array in the transmitter may include lasers that emit optical beams with individual, distinct wavelengths. For example, certain rows, columns or other groupings of lasers may operate with wavelengths that are different from other rows, columns or other groupings of lasers. Such a multi-wavelength LIDAR systems offer finer angular resolution and performance in a low-cost, compact optical design than single wavelength LIDAR systems. Furthermore, multi-wavelength LIDAR systems of the present teaching can provide a simple path to improved security and parallelization. See, for example, U.S. patent application Ser. No. 15/456,789, entitled "Multi-Wavelength LIDAR System" filed on Mar. 13, 2017 and U.S. Provisional Patent Application No. 62/396,295, entitled "WDM Lidar System" filed on Sep. 19, 2016, which are both incorporated herein by reference.

The methods and apparatus of the present teaching can be used with multi-wavelength noise-adaptive LIDAR systems, which use lasers or arrays of lasers that emit light at different frequencies. These systems may include integrated or separate collimation optics to form a desired beam profile at various target planes across the field-of-view and range of the LIDAR system, and an associated desired illumination region that is a function of wavelength at the detector array. In various systems, the receiver may or may not be wavelength sensitive. In embodiments in which the receiver is able to distinguish light from the two wavelengths emitted by the laser sources that emit different wavelengths, reflected illumination from each wavelength is processed separately. In these embodiments, in addition to illumination region shape and size as a function of time, the controller is able to determine the wavelengths of the illumination regions based on which lasers are pulsed on and off. In this way, wavelength of the illumination region becomes part of a desired illumination pattern.

Figure 6B:
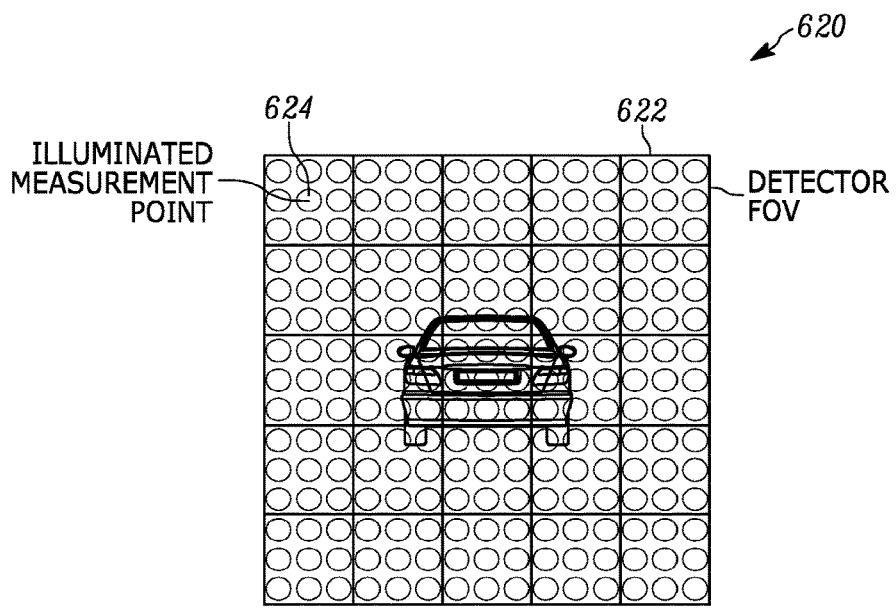
FIG. 6B illustrates a two-dimensional projection of the system field-of-view of the noise-adaptive solid state LIDAR system of FIG. 6A.

The receiver illustrated in FIG. 6A can be a solid-state with no moving parts. The receiver uses a detector array 604 that typically has a fewer number of individual detector elements than the transmitter array 602 has individual lasers. FIG. 6B illustrates a two-dimensional projection of the system field-of-view 620 of the LIDAR system of FIG. 6A. An individual detector field-of-view of the detector array 604 is shown as a small square 622. An illuminated measurement point associated with an individual laser in the transmitter array 602 is illustrated by a circle 624. FIG. 6B shows that the ratio of the number of detectors to the number of lasers in each array is one to nine, respectively. In this example, the detector array is a 5×5 array. Compared to a flash system with equivalent angular resolution, the detector array 604 cost of the LIDAR system shown in FIG. 6A can be lower because the number of detectors can be lower. The measurement resolution of the system in FIG. 6A is not determined by the size of the detector elements, but instead is determined by the number of lasers in the transmitter and the collimation of the individual laser beams.

The required size of the detector array 604 and each detector element is influenced by several factors, including the overall receiver field-of-view, the focal length of the receive optics 608, and the noise on each detector. For an automotive system that operates outdoors, the background noise generated by the sun must be taken into account when designing high performance receivers. The solar radiation noise must be limited by appropriate choice of wavelength blocking filters, as well as limiting the individual detector field-of-view. If the LIDAR system were operated indoors only, without any solar radiation noise, then the size of the detectors can be made much larger, limited only by the RF requirements on the detector (O/E bandwidth, rise time, fall time, etc.).

Figure 6C:
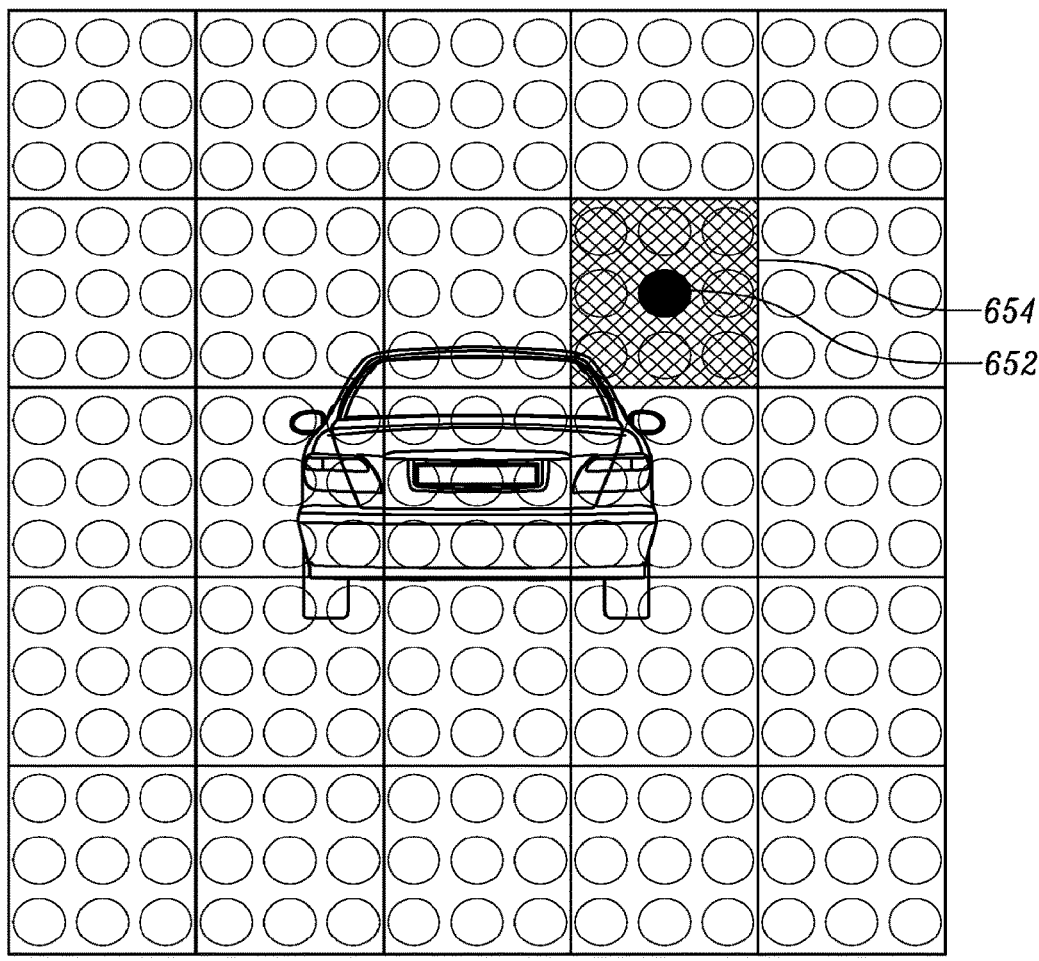
FIG. 6C illustrates a two-dimensional projection of the system field-of-view of the noise-adaptive solid state LIDAR system of FIG. 6A highlighting an individual laser and individual detector.

FIG. 6C illustrates a two-dimensional projection of the system field-of-view 650 of the LIDAR system described in connection with FIG. 6A for an individual laser and individual detector. FIG. 6C illustrates a critical aspect of the embodiment of FIG. 6A. In FIG. 6C, a single 3D measurement point in the overall FOV of the LIDAR system of FIG. 6A is highlighted, with that measurement point shown as a dark circle 652. This point corresponds one-to-one with a specific individual laser in the laser array 602. It can be further seen in FIG. 6C, that this measurement point falls within an individual detector, where the FOV of that individual detector has been shown as a square 654 with a cross-hatch pattern to identify it. In some embodiments, each individual laser in the LIDAR system is pulsed individually, and a LIDAR system of the present teaching has knowledge of the relationship between the angular projection angle of each laser and the corresponding field-of-view of each individual detector. As such, the system is able to establish a correspondence between a particular laser firing pattern and associated illumination region and the particular detector elements that are illuminated by the illumination region. A LIDAR system of the present teaching uses this correspondence information to adaptively lower the noise incoming to the TOF measurement circuitry. Further description of the manner in which the measurement noise can be minimized is described below.

In some embodiments of the present teaching, an individual laser measurement point might overlap multiple detectors, where the number of detectors is a subset of the total number of detectors. It is not necessary to have a one-to-one correspondence between a single laser and a single detector. All that is required is for the LIDAR system to understand the correspondence between an individual laser and the individual detector field-of-view to be able to identify which detectors will receive reflected light from a particular laser.

In embodiments using groups or arrays of detectors, the anodes within the array or subarray can be connected to a single input, and the cathodes within the array or subarray can be connected to a single output, such that to the outside circuit, the array or subarray device act like a single element. The arrays or subarray of detectors may or may not be contiguous, and may or may not be connected in parallel to generate a single output. In some embodiments, the field-of-view of the individual detectors, arrays or subarrays is restricted to reduce the impact of solar background noise.

Individual lasers or arrays of lasers are pulsed to generate an illumination region at the detectors. This illumination region can have a variety of shapes and sizes, based on the pattern of lasers that are fired for the particular measurement. For example, a single laser may be fired generating a single laser field-of-view illumination shape at the detector. As described above this illumination region can have a variety of sizes depending on the design of the LIDAR system. When multiple lasers are fired, the shape and size of the illumination region will depend on the position of the fired lasers and each individual laser field-of-view.

The detector array can have a variety of configurations, including various detection area sizes and shapes and the array spacing. As such, illumination regions may cover multiple detectors in an array, or a single detector. Because the illumination region and the detector configurations are known, even with more complex illumination regions and associated detection regions, there is a one-to-one correspondence between a laser firing pattern and the detector or groups of detectors that fall within the illumination region. This correspondence information is used by the controller to adaptively lower the noise see by the input of the TOF measurement circuitry from the detector array.

Figure 7A:
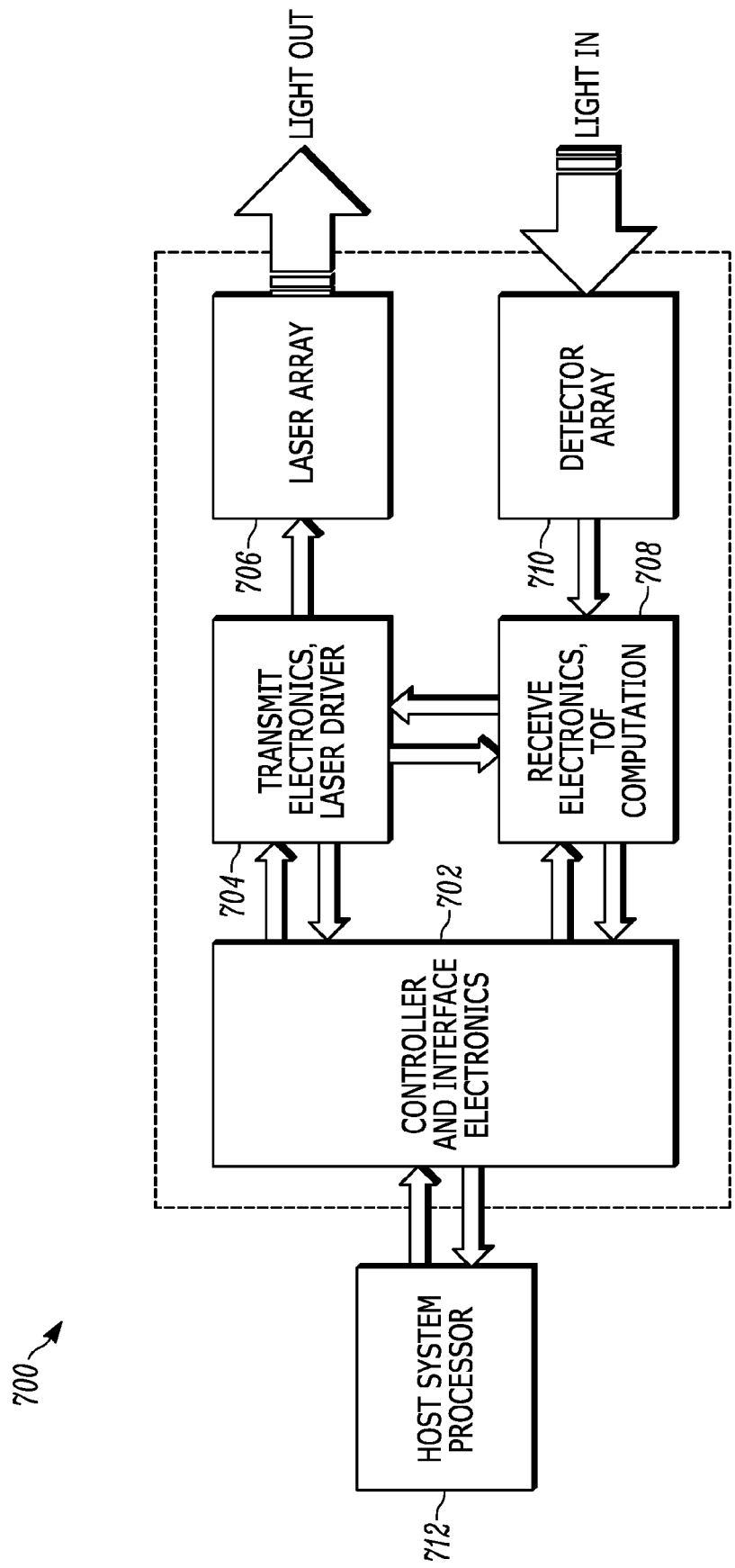
FIG. 7A illustrates a block diagram for an embodiment of the noise-adaptive solid state LIDAR system according to the present teaching.

FIG. 7A shows a LIDAR system block diagram 700 for an embodiment according to the present teaching. The LIDAR system has five main components: controller and interface electronics 702, transmit electronics 704 including laser driver, laser array 706, receive and TOF computation electronics 708, and the detector array 710. The controller and interface electronics 702 controls the overall function of the LIDAR system and provides the digital communication to the host system processor 712. The transmit electronics 704 controls the operation and laser array 706 and sets the pattern of laser firing. The receive and TOF computation electronics 708 receives the electrical detection signals from the detector array 710, and processes these electrical detection signals to compute the range distance thru time-of-flight calculations.

Figure 7B:
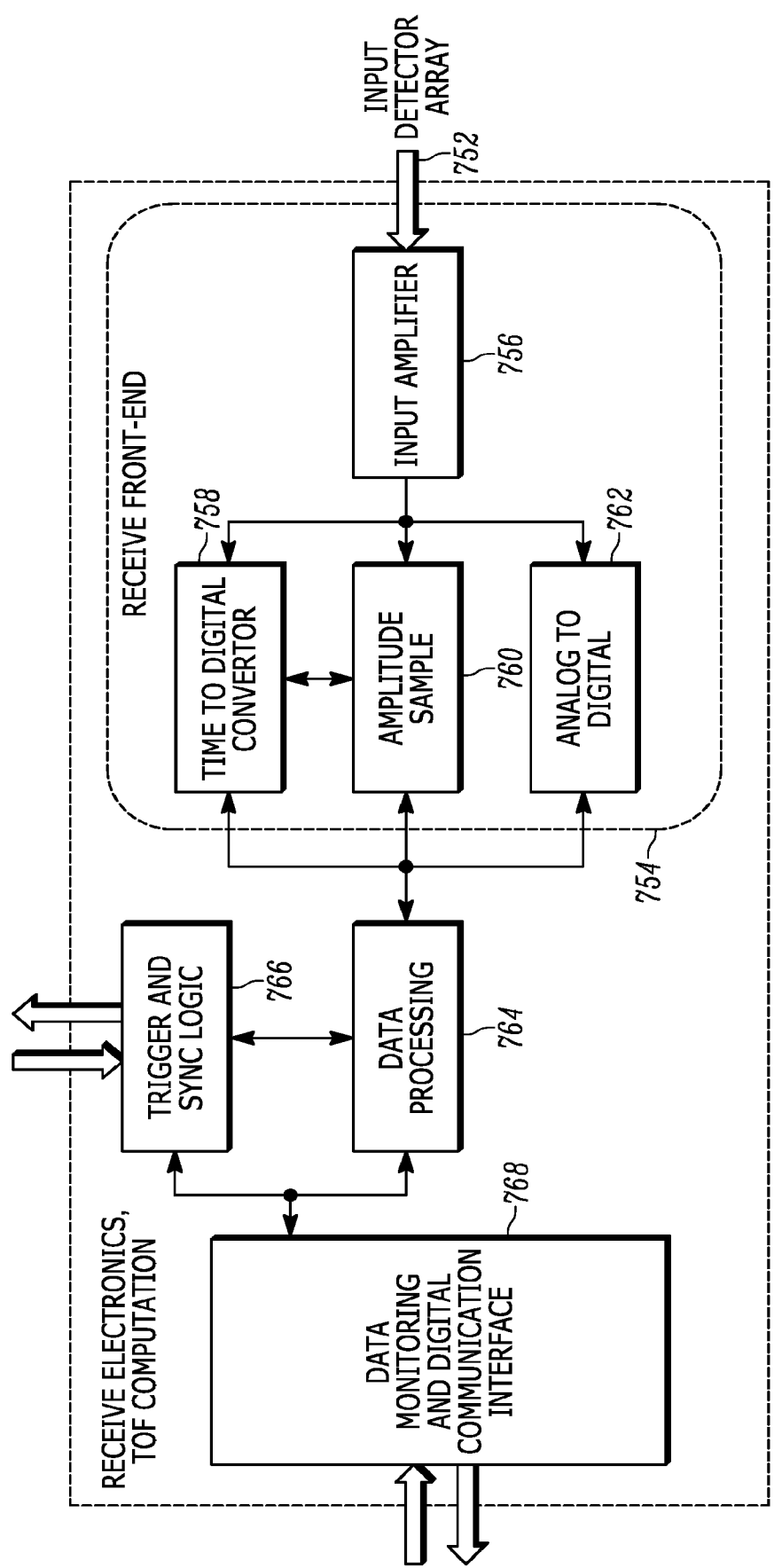
FIG. 7B illustrates a detailed block diagram of the receive and TOF computation electronics of the embodiment of the noise-adaptive solid state LIDAR system of FIG. 7A.

FIG. 7B illustrates a detailed block diagram 750 of the receiver and TOF computation electronics 708 described in connection with FIG. 7A. The received electrical detection signal 752 from the detector array is input to a receiver front-end 754 that incorporates an input amplifier 756 that boosts the received electrical detection signals 752 from the detector before further processing. The signal output from this amplifier can be split to several different circuits. Three possible circuits 758, 760, 762 are shown which may be used together or in any combination. The Time-to-Digital Convertor (TDC) 758 is a specialized circuit that recognizes when the input signal crosses some amplitude threshold, and provides a digital representation of the time of that event. For a TOF measurement system, the event typically corresponds to the arrival of a reflected transmit pulse and the time of this arrival corresponds to the distance of the object. The amplitude signal block 760 is a circuit that is triggered by the same event as the TDC 758, but instead of recording the time, it records the amplitude. The analog-to-digital circuit 762 converts the analog received electrical detection signals into a digital signal corresponding to some sampling rate. The processed signals received from the receiver front end 754 are input to a data processing circuit 764 that interfaces with a trigger and sync lock circuit 766. A data monitoring and digital communication interface 768 then sends signals to the controller and interface electronics 702 (FIG. 7A).

One skilled in the art will appreciate that the block diagrams shown in FIGS. 7A-B, which illustrate functions of the LIDAR system, are not limiting the present teaching to any specific hardware configuration. Each of these circuits may be separate circuits or integrated. For example, the transmit and receive blocks may be on separate printed circuit board assemblies (PCBA) and/or separate modules. For the receive electronics block, all or part of the front end may be part of an integrated circuit that is attached directly to the detector array, or these circuits may be on the PCBA with other circuits. In some embodiments, the controller function might be combined with some or all of the transmit and receive electronics inside a field programmable gate array (FPGA) or application-specific integrated circuit (ASIC).

Figure 8:
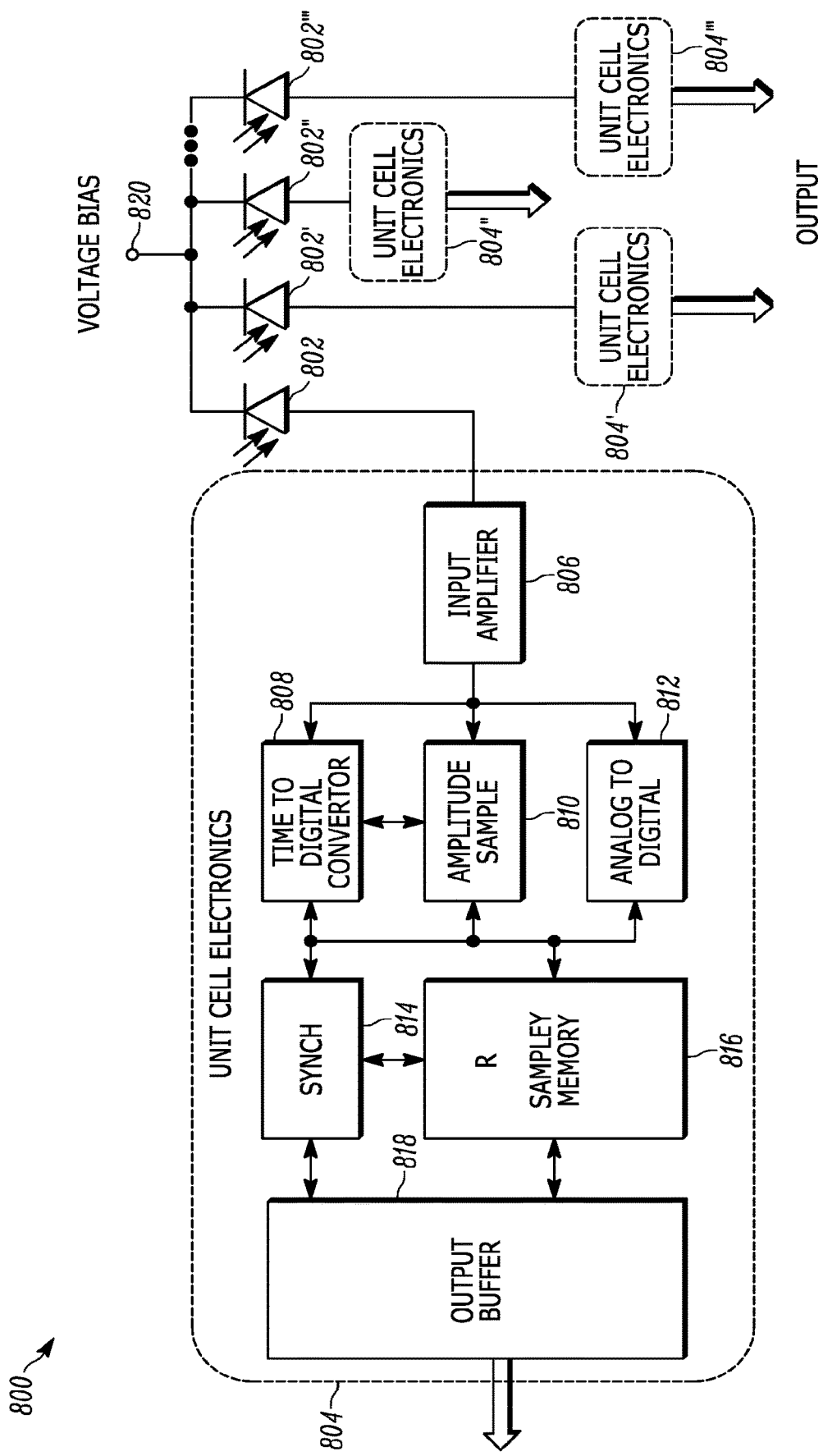
FIG. 8 illustrates a block diagram of a known Focal Plane Array (FPA).

FIG. 8 shows a block diagram 800 for a known Focal Plane Array (FPA). An FPA is typically referred to as an assembly that has both a detector array chip, and a readout integrated circuit (ROIC), which are attached together to form a hybrid assembly. Each individual detector 802, 802', 802", 802''' in the array is shown and its corresponding individual ROIC 804, 804', 804", 804''' denoted in the block diagram as "unit cell electronics." The detector 802, 802', 802", 802''' and individual ROIC 804, 804', 804", 804''' for each detector 802, 802', 802", 802''' act together as an independent device, sometimes referred to as a "smart pixel". The ROIC 804, 804', 804", 804''' contains the circuitry that allows parallel measurement of the TOF for the received electrical detection signals from each detector 802, 802', 802", 802''', with each detector 802, 802', 802", 802''' having its own TOF circuitry. The ROIC 804, 804', 804", 804''' includes an input amplifier 806, TDC 808, amplitude signal block 810, analog to digital circuit 812, synchronization 814, sampler and/or memory 816, and an output buffer 818. Like a camera, the ROIC 804, 804', 804", 804''' stores the TOF information for each unit cell in the buffer 818, in order that the TOF information can be readout/transferred to the external circuit. An ROIC 804, 804', 804", 804''' can also include additional circuitry to not only capture the timing of the return pulse, but also amplitude information. Note, however, that a typical FPA has a single voltage bias 820 shared by all detectors 802, 802', 802", 802''' in the array.

Since each detector 802, 802', 802", 802''' has its own dedicated unit cell electronics 804, 804', 804", 804''', it can be understood that the circuitry on the ROIC chip scales linearly with the detector elements. For a large number of detectors, this configuration adds significantly to the cost of the system. Also, using large numbers of detectors adds significantly to the full frame refresh rate. Between each transmitter pulse, the system must wait the time required for the light to reflect from the maximum range of interested, and then all the data from each smart pixel must be transferred through the ROIC output buffer. Depending on various factors, such as the number of pixels, the amount and type of the data, the speed of the output buffer, and other factors, the time required for a full measurement cycle can vary significantly. FPAs typically operate with full frame refresh rate on the order of 60 Hz, similar to cameras. With this relatively slow refresh rate, a LIDAR system typically must calculate distance based only on single pulse measurements as there is inadequate time to average multiple pulses.

Figure 9:
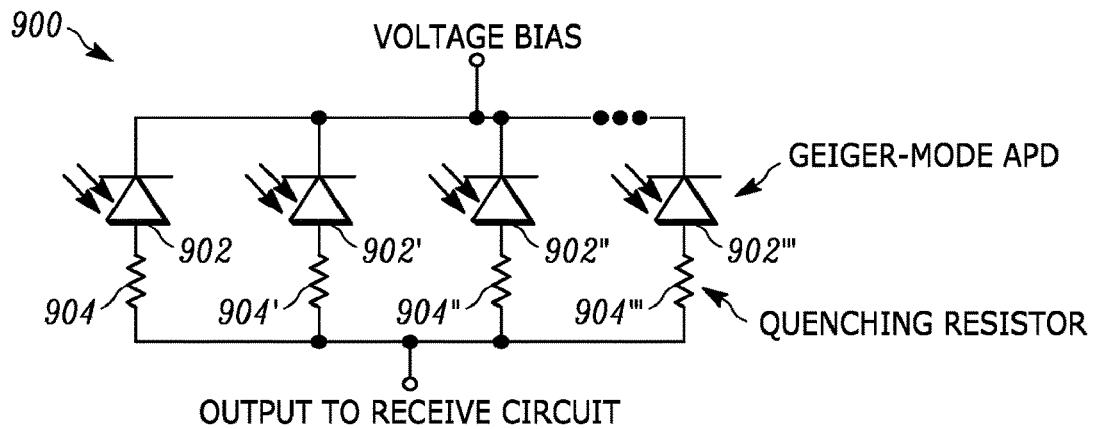
FIG. 9 illustrates a schematic of a known silicon photomultiplier, multi-pixel photon counter (MPPC) detector.

FIG. 9 shows a schematic of a known Geiger-mode avalanche photo-diode (APD) array, also referred as a silicon photomultiplier (SiPM) or multi-pixel photon counter (MPPC) 900. As illustrated in FIG. 9, the MPPC 900 consists of several APD 902, 902', 902", 902''' operated in Geiger-Mode, each with its own quenching resistor 904, 904', 904", 904'''. The Geiger-Mode APD 902, 902', 902", 902''' are all connected in parallel. The output from the MPPC 900 will be a sum of the responses of each individual Geiger-Mode APD 902, 902', 902", 902'''. In this way, the MPPC 900 can generate a pseudo-linear response to multiple photon events, when the light is incident across multiple Geiger-Mode APD elements 902, 902', 902", 902'''.

Figure 10A:
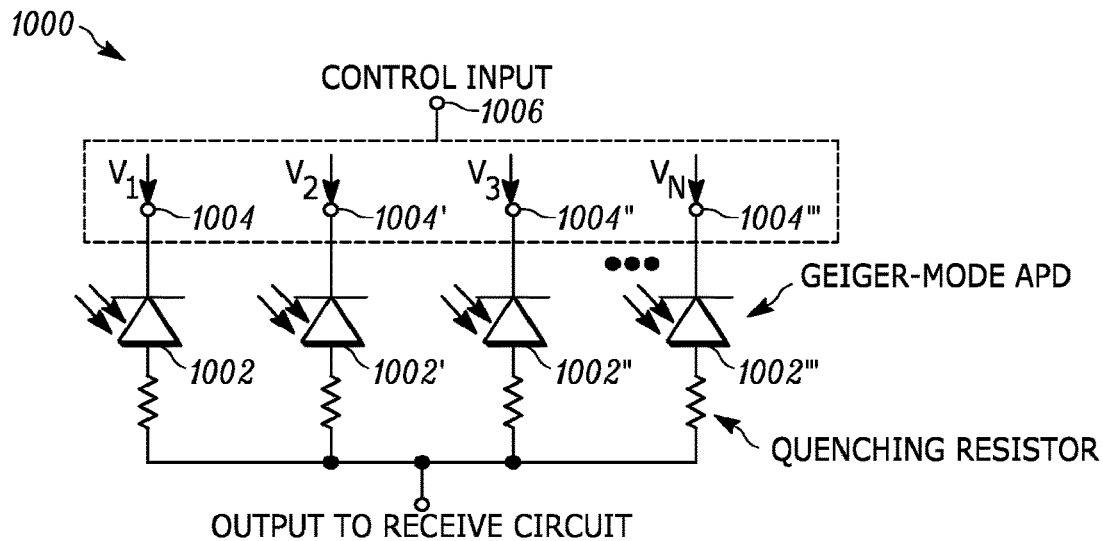
FIG. 10A illustrates a schematic of an embodiment of a controlled detector array using Geiger-Mode APD and quenching resistor for a noise adaptive solid-state LIDAR system according to the present teaching.
Figure 10B:
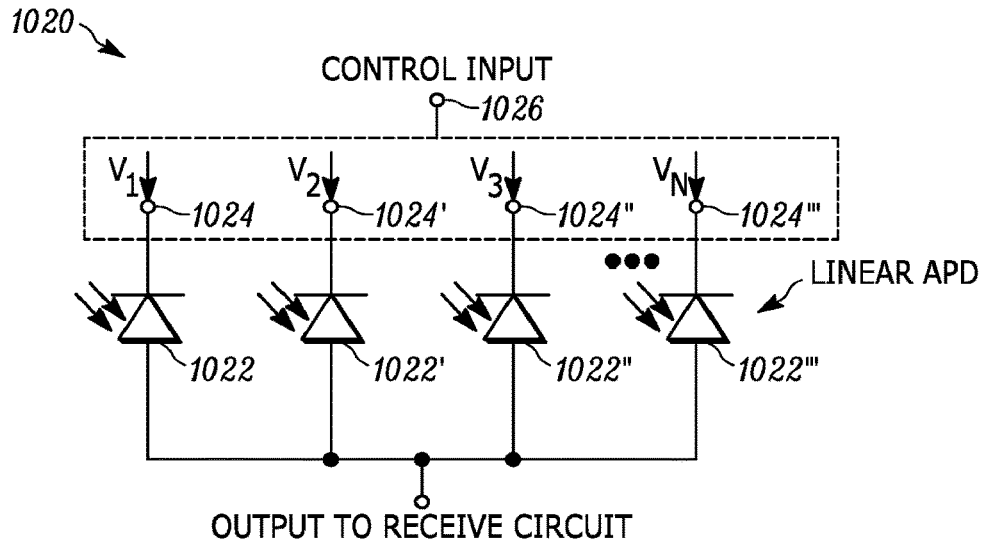
FIG. 10B illustrates a schematic of an embodiment of a controlled detector array using a Linear APD for a noise adaptive solid-state LIDAR system according to the present teaching.
Figure 10C:
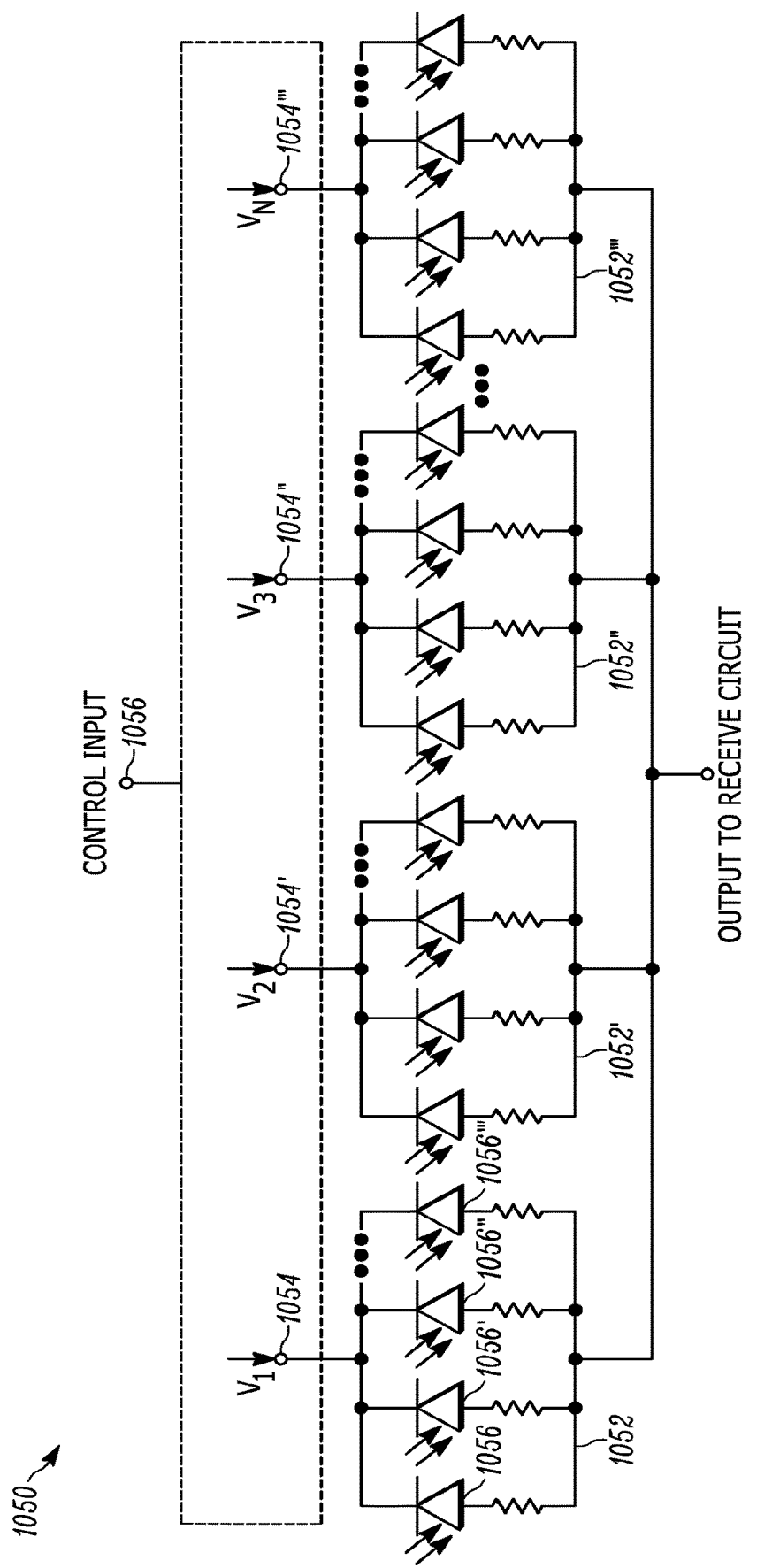
FIG. 10C illustrates a schematic of an embodiment of a controlled detector array using a four-element detector sub-array with Geiger-Mode APD and quenching resistor for a noise adaptive solid-state LIDAR system according to the present teaching.

FIG. 10A illustrates a schematic diagram of an embodiment of a controlled detector array 1000 with Geiger-Mode APD and quenching resistor for a noise adaptive solid-state LIDAR system according to the present teaching. FIG. 10B illustrates a schematic of an embodiment of a controlled detector array 1020 with a Linear APD for a noise adaptive solid-state LIDAR system according to the present teaching. FIG. 10C illustrates a schematic of an embodiment of a controlled detector array 1050 using a four-element detector sub-array with Geiger-Mode APD and quenching resistor of a noise adaptive solid-state LIDAR system according to the present teaching. Referring to FIGS. 10A-10C, in each of these embodiments, the voltage bias to individual detectors or to sub-arrays of detectors can be controlled by the LIDAR system independently. In FIG. 10A, an array of detector elements, Geiger-mode APD 1002, 1002', 1002", 1002''', similar to that of the MPPC 900 of FIG. 9, is shown. Instead of a single voltage bias for all elements as shown in FIG. 9, each Geiger-Mode APD 1002, 1002', 1002", 1002''' has its own voltage supply 1004, 1004', 1004", 1004'''. By making use of individual control of the APD bias using the individual voltage supplies 1004, 1004', 1004", 1004''' that are controlled by a control input 1006, the LIDAR system can adaptively lower the voltage on detectors whose field-of-view is outside the field-of-view of the specific laser being currently pulsed, as described in connection with FIG. 6B.

In other words, the controller lowers the voltage on detectors whose field-of-view is outside the illumination region generated by the particular group of laser elements that are pulsed or activated by the controller. For the detectors outside the current single pulse transmitter field-of-view, the voltage bias on those detectors can be brought below the voltage breakdown point or even substantially or completely turned off.

There are two categories of noise in the electrical detection signal that the LIDAR system according to the present teaching acts to minimize. The first category is the electrical noise produced by the detector independent of any light incident on the diode. This noise is often referred to as a dark current. For the detectors used in LIDAR systems, such as linear APD, Geiger Mode APD, SPAD, and MPPC, the electrical noise produced by these detectors diode is significant even when no light is present. The electrical noise is a significant function of the applied voltage bias, so by lowering the applied voltage bias, the electrical noise for a detector is significantly reduced.

The second category of noise in the electrical detection signal that the LIDAR system of the present teaching acts to minimize is the noise contribution to the system from solar radiation. The sun produces strong radiation in the wavelengths of interest, and there will be photons continually incident on the receiver because of the solar radiation. These photons which are not from the transmitted laser pulse, will produce a signal response which we can consider as an additional random noise source to the dark current noise. If care is not taken in the receiver design, the noise signal level from the photons incident from the solar radiation can be high enough to limit the range of the LIDAR system.

In the LIDAR system of the present teaching, both the detector dark current and the solar noise are suppressed. In the embodiment of the controlled detector array 1000 shown in FIG. 10A, the voltage 1004, 1004', 1004", 1004''' is reduced based on a control input 1006 on all detectors 1002, 1002', 1002", 1002''' which are not receiving reflected light from the current transmit pulse. In this fashion, the output signal (noise) on those detectors with the lowered voltage bias will be significantly reduced, and this will reduce the overall noise on the common summed output. Thus, the control input 1006 reducing the voltage 1004, 1004', 1004", 1004''' effectively selects the particular detector outputs that are connected to the downstream receive circuitry. Referring also to FIG. 7B, in some embodiments the control input 1006 reducing the voltage 1004, 1004', 1004", 1004''' effectively selects the particular detector 1002, 1002', 1002", 1002''' outputs that are connected to the input amplifier 756 of FIG. 7B.

FIG. 10B illustrates a similar embodiment of a controlled detector array as shown in FIG. 10A but instead of Geiger-Mode APD, this embodiment uses a controlled detector array 1020 including linear APD 1022, 1022', 1022", 1022'''. Similar to the controlled detector array 1000 shown in FIG. 10A, the bias voltage can also be reduced on the linear APD 1022, 1022', 1022", 1022''' to reduce the output signal (noise) on those detectors with the lowered voltage bias in order to reduce the overall noise on the common summed output.

FIG. 10C illustrates an embodiment of the controlled detector array 1050 where sub-arrays 1052, 1052', 1052", 1052''' of Geiger-Mode APD are used. The operating principle, as described in connection with the embodiment shown in FIG. 10A, can be similarly applied to the system shown in FIG. 10C, with each sub-array acting as a single element. The controlled detector array 1050 uses controllable voltage bias 1054, 1054', 1054", 1054''' that are controlled by a control input 1056. In this configuration, bias voltages 1054, 1054', 1054", 1054''' control the detectors 1056, 1056', 1056", 1056''' in the sub-array 1052, 1052', 1052" and 1052'''.

Figure 11A:
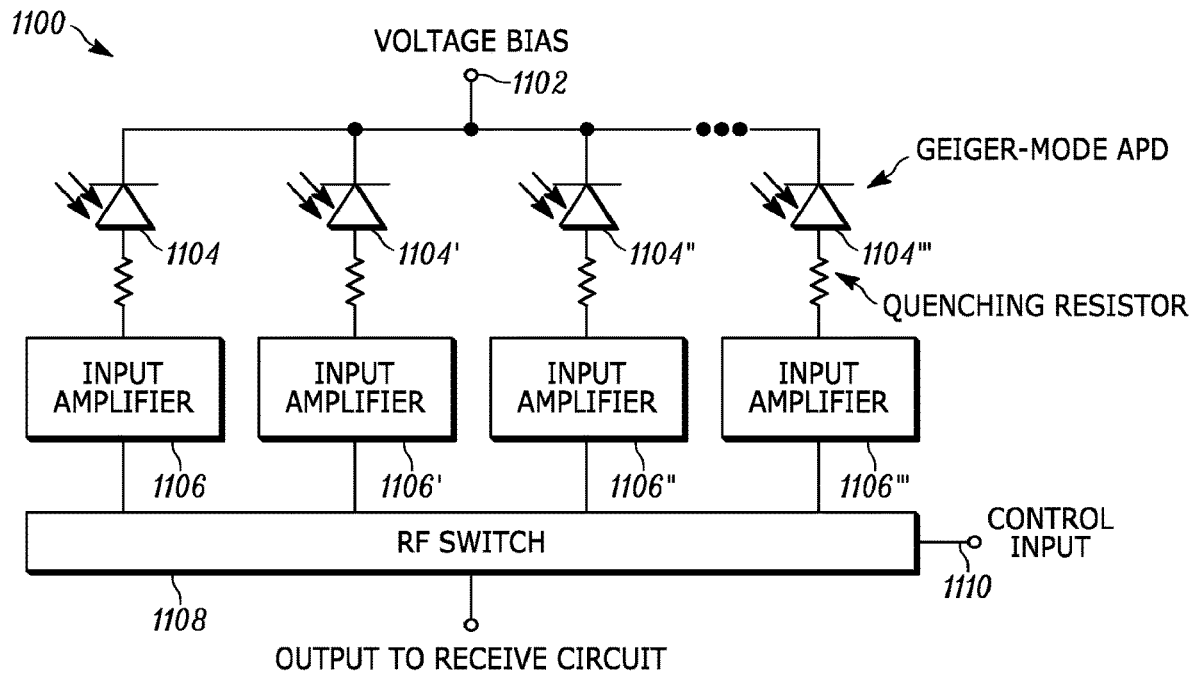
FIG. 11A illustrates a schematic for an embodiment of a controlled detector array with a Geiger-Mode APD and quenching resistor of a noise adaptive solid-state LIDAR system of the present teaching.
Figure 11B:
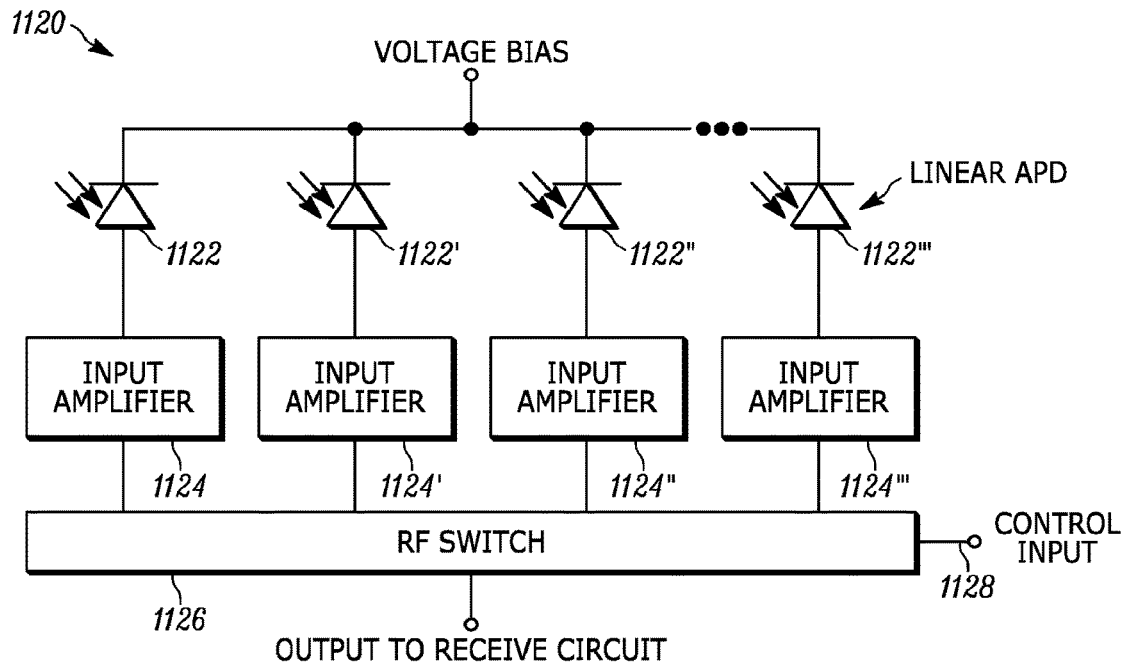
FIG. 11B illustrates a schematic for an embodiment of a controlled detector array using a Linear APD for a noise adaptive solid-state LIDAR system of the present teaching.
Figure 11C:
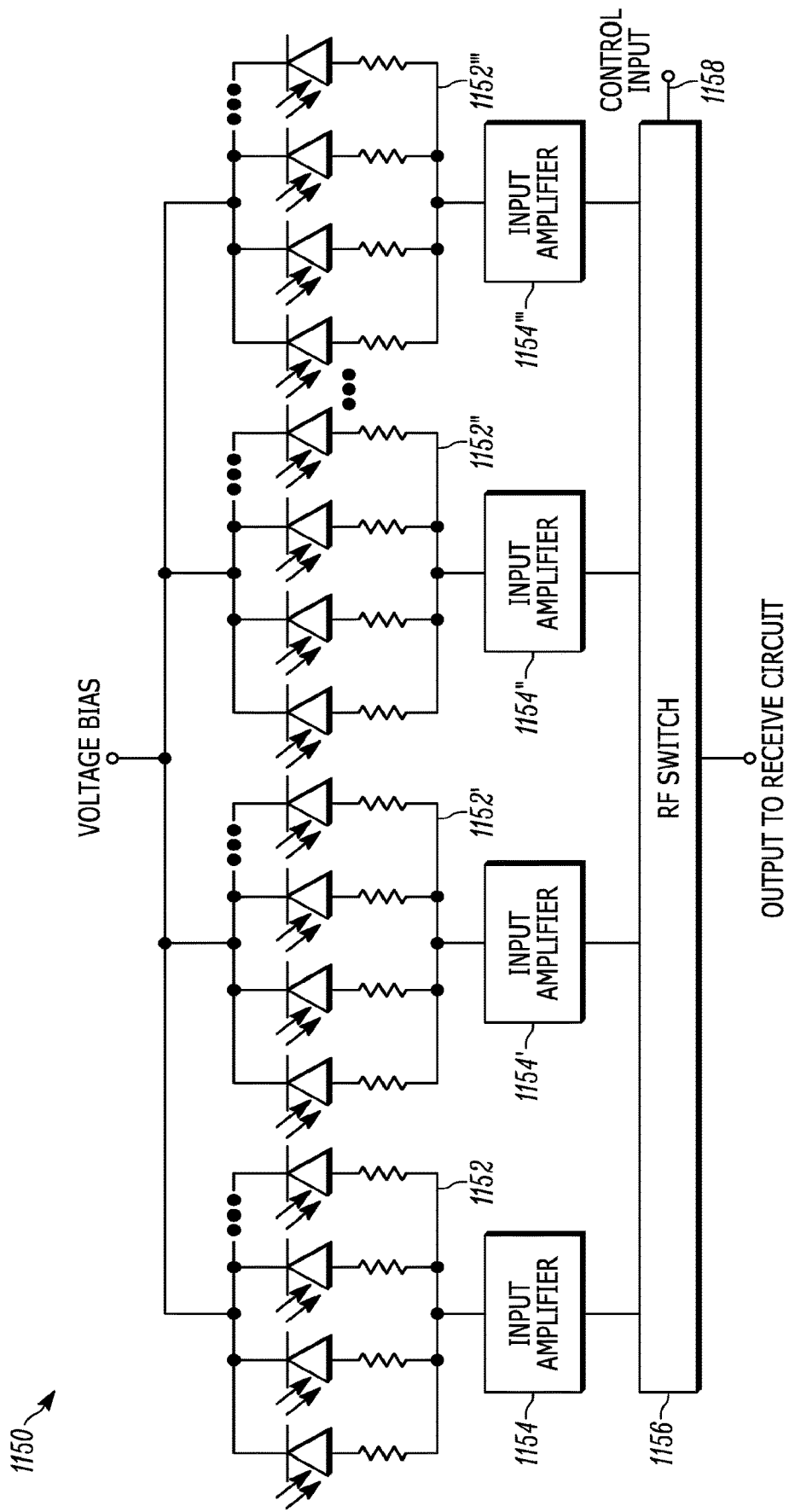
FIG. 11C illustrates a schematic for an embodiment of a controlled detector array comprising four-element detector sub-arrays with Geiger-Mode APD and quenching resistors of a noise adaptive solid-state LIDAR system of the present teaching.

FIG. 11A illustrates a schematic of an embodiment of a controlled detector array 1100 with Geiger-Mode APD and quenching resistor for a noise adaptive solid-state LIDAR system according to the present teaching. FIG. 11B illustrates a schematic of an embodiment of a controlled detector array 1120 with Linear APD for a noise adaptive solid-state LIDAR system according to the present teaching. FIG. 11C illustrates a schematic of an embodiment of a controlled detector array 1150 comprising four-element detector sub-arrays with Geiger-Mode APD and quenching resistor 1050 for a noise adaptive solid-state LIDAR system according to the present teaching.

In FIG. 11A, a common voltage bias 1102 is used to bias all detectors 1104, 1104', 1104", 1104''' in a MPPC array. However, the output from each Geiger-Mode APD 1104, 1104', 1104", 1104''' is no longer connected directly to a common output as described in connection with FIG. 9. Instead, the output from each APD 1104, 1104', 1104", 1104''' is connected to an input amplifier 1106, 1106', 1106", 1106''', and then to an RF switch 1108. The RF switch 1108 is used to direct only the output from the detector 1104, 1104', 1104", 1104''' that is being utilized to a single receive signal output. In this configuration, the noise contribution from all but one of the detectors is substantially eliminated, offering a major potential noise reduction. Again, this is particularly important in an automotive application, where solar noise is continually illuminating the full field-of-view, and generating noise in all detectors. In some embodiments, rather than controlling a single laser and detector, the input 1110 from the controller sets the RF switch 1108 to direct output from a subset of detectors whose field-of-view is inside the illumination region generated by the particular group of laser elements that are pulsed or activated by the controller.

FIG. 11B illustrates a similar embodiment of the controlled detector array described in connection with FIG. 11A, but instead of Geiger-Mode APD, this embodiment includes a controlled detector array 1120 using Linear APD 1122, 1122', 1122", 1122'''. The linear APD 1122, 1122', 1122", 1122''' connect to input amplifiers 1124, 1124', 1124", 1124''' and then to the RF switch 1126 that is controlled via a control input 1128. In operation, the RF switch 1126 directs under control of the control input 1128 only the output from those detectors 1122, 1122', 1122", 1122''' that fall within the illumination region generated by the controlled transmitter array to the downstream electronics.

FIG. 11C illustrates an embodiment of the controlled detector array 1150 where sub-arrays 1152, 1152', 1152", 1152''' of Geiger-Mode APD are used. The embodiment shown in FIG. 11C is similar to the embodiment described in connection with FIG. 11A where each sub-array 1152, 1152', 1152", 1152''' acting as a single element. The controlled detector array 1150 includes input amplifiers 1154, 1154', 1154", 1154''' connected to an RF switch 1156 that is controlled by a control input 1158. The RF switch 1156 is configured via a control input 1158. In operation, the RF switch 1156 directs under control of the control input 1158 only those detector sub-arrays 1152, 1152', 1152", 1152''' that fall within the illumination region generated by the controlled transmitter array to the downstream electronics or receive circuitry.

It will be clear to those skilled in the art that the embodiments illustrated in FIGS. 10A-C and 11A-C are just six examples of many possible embodiments that might use PIN, APD, Geiger-Mode APD, MPPC, or other types of detectors with either individual detectors or array or sub-arrays of detectors. Those skilled in the art will also appreciate that the present teachings include a mix of embodiments described in connection with FIGS. 10A-B and 11A-B with both voltage control (FIGS. 10A-B) and RF switching (FIGS. 11A-B) used together to further optimize noise on the measurement output.

In some embodiments, such as, for example the embodiments described in connection with FIGS. 10A-B and FIGS. 11A-B, the receive signal output is directed to a subsequent TOF computation circuit through a single connection. The subsequent receive circuit functionality is as described in the block diagram from FIGS. 7A and 7B. It's important to note that the LIDAR system of the present teaching does not use an FPA, where each detector must have its own TOF computation circuitry. In the LIDAR system of the present teaching, the TOF computation circuitry is shared amongst many detectors. Such a configuration is significantly less complex and has significantly lower cost depending on the system architecture compared to LIDAR systems using an FPA. In addition, LIDAR systems according to the present teaching can offer significant cost and power reduction by minimizing the number of high-speed A/D required.

Figure 12:
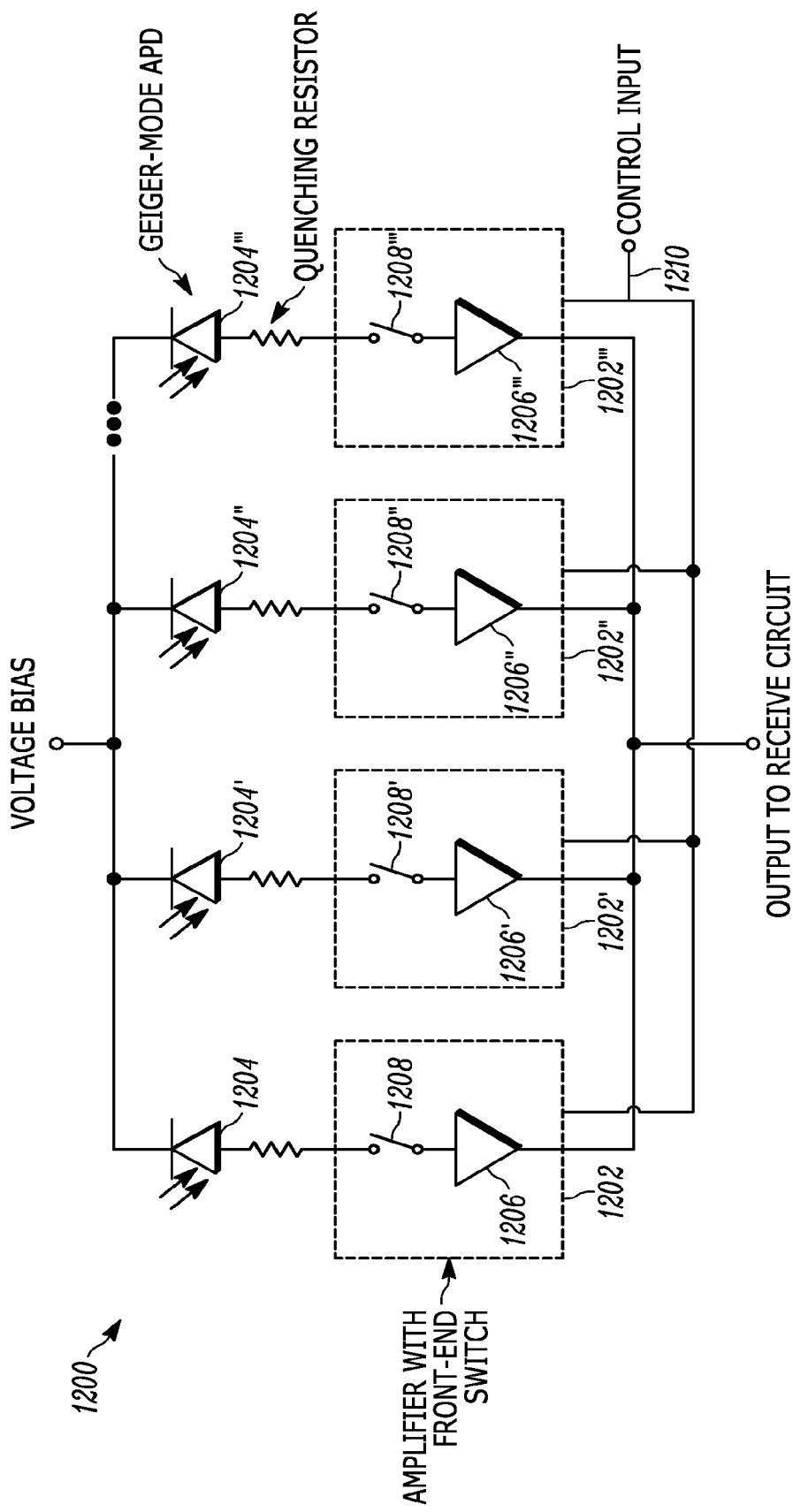
FIG. 12 illustrates an embodiment of a controlled detector array with amplifier with front-end switch of the LIDAR system of the present teaching.

FIG. 12 illustrates a controlled detector array 1200 with amplifier front-end switches 1202, 1202', 1202'', 1202''' of an embodiment of the LIDAR system according to the present teaching. It is very common in optical receivers to place a first amplifier immediately adjacent to the photodiode to increase the signal before subsequent processing. Often these amplifiers are trans-impedance amplifiers which covert the current generated by the detector to a voltage signal, either single-ended or differential. In the embodiment described in connection with FIG. 12, each detector 1204, 1204', 1204'', 1204''' has a dedicated amplifier front-end switch 1202, 1202', 1202'', 1202''' that incorporates an amplifier 1206, 1206', 1206'', 1206''' and a switch 1208, 1208', 1208'', 1208'''. The switch 1208, 1208', 1208'', 1208''' in each amplifier front-end switch 1202, 1202', 1202'', 1202''' is controlled by the control input 1210 to direct only those detector 1204, 1204', 1204'', 1204''' that fall within the illumination region generated by the controlled transmitter array to the downstream electronics or receive circuitry. It is well known that even a single transistor can be used as a switch, so the cost and complexity to incorporate such functionality into such an amplifier structure can be very small. It should be clear to those skilled in the art that the embodiment in FIG. 12 can be extended to other detector structures, as described by FIGS. 10B-C and 11B-C.

Figure 13:
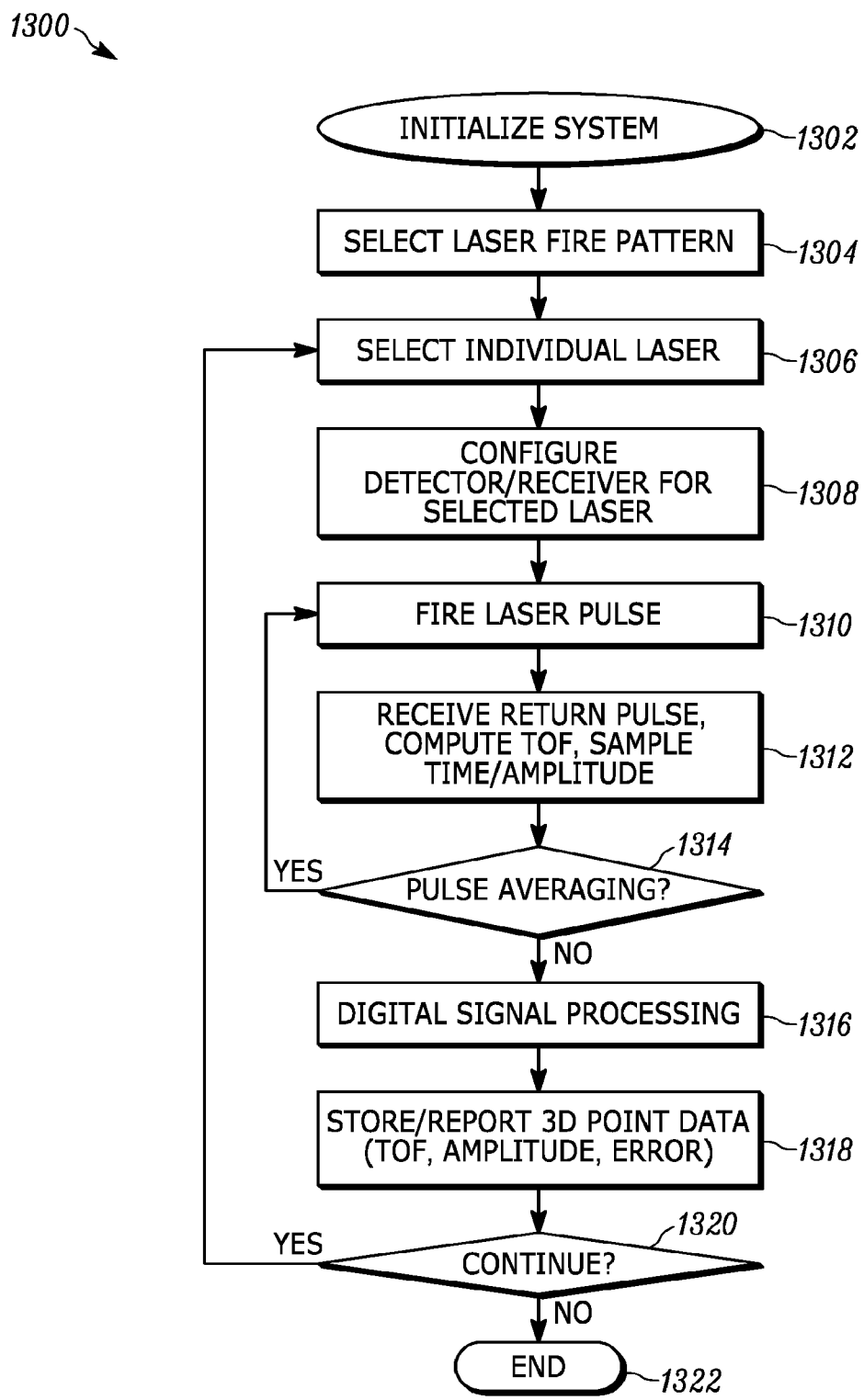
FIG. 13 illustrates a flow chart of an embodiment of a method to implement an algorithm of the noise-adaptive solid-state LIDAR system of the present teaching.

FIG. 13 illustrates a flow chart of a method 1300 of implementing an algorithm of the noise-adaptive solid-state LIDAR system of the present teaching. In the first step 1302 of the method 1300, a controller is initialized. The controller may be, for example the controller 702 shown in FIG. 7A, but the controller may be any controller that is connected to both the transmit array and detector array of the noise-adaptive solid-state LIDAR system.

In the second step 1304 of the method 1300, a desired illumination pattern for generating the 3D point cloud is selected by the controller. The illumination pattern includes a particular illumination spatial shape that may also change as a function of time. The controller can pulse individual lasers, or groups of lasers, on and off to provide a desired illumination pattern at the target range and associated illumination region on the detector array. In some embodiments, the pattern is a simple row-by-row scan of each laser element in a row, continually repeated to provide a uniform refresh rate. In other embodiments, the pattern is pseudo-random where the system moves from measurement point to measurement point in a non-continuous manner that still acts to cover the full field-of-view of the entire transmitter array uniformly over time.

In the third step 1306 of the method 1300, the controller selects an individual laser, or group of lasers, to fire based on the desired pattern. The controller then configures the controllable detector array and receiver to minimize the measurement noise in the fourth step 1308 of the method 1300. Numerous methods of noise minimization can be used, as described above in connection with the description of FIGS. 10-12.

In the fifth step 1310 of the method 1300, the LIDAR system fires the laser or lasers that have been selected in the third step 1306. In the sixth step 1312 of the method 1300, the LIDAR system receives at the controlled detector array the optical pulses from the fired lasers and calculates TOF and samples amplitude/time as desired. The system determines whether pulse averaging is implemented in the seventh step 1314. If pulse averaging is implemented, then the method loops through the fifth step 1310 and the sixth step 1312 of the method 1300, firing the same laser or groups of lasers, and taking measurements on the received signal from that laser or lasers as many times as required by the desired amount of averaging. For example, in one specific method, the averaging fires up to four pulses in order to improve the SNR. In other specific methods, the averaging may fire up to twenty five pulses, which takes a longer time, but provides more improvement in SNR than the four pulse averaging.

Thus, in some embodiments, a combination of multiple measurement points using multiple laser pulses in a particular field-of-view is averaged to determine object distances to improve SNR. Multiple pulses from the same laser are averaged at the detector to increase the signal. Various embodiments use different numbers of pulses. While more pulses lead to better SNR, the system is limited in how many pulses can be averaged based on the time allowed by the system refresh rate. In some embodiments four or more pulses are used. In other embodiments, ten or more pulses are used, and in still other embodiments more than twenty-five pulses are used.

In the eighth step 1316 of the method 1300, after obtaining the desired number of pulses for an individual laser or lasers, the system can apply digital signal processing to manipulate the data in some fashion. After processing, the controller stores and/or communicates the data in the ninth step 1318. In the tenth step 1320 of the method 1300, a decision to stop or continue is made. The controller then moves onto the next laser in the pattern at step three of the method. The system continually operates to sweep through the desired pattern until stopped at the eleventh step 1322 of the method 1300.

Figure 14:
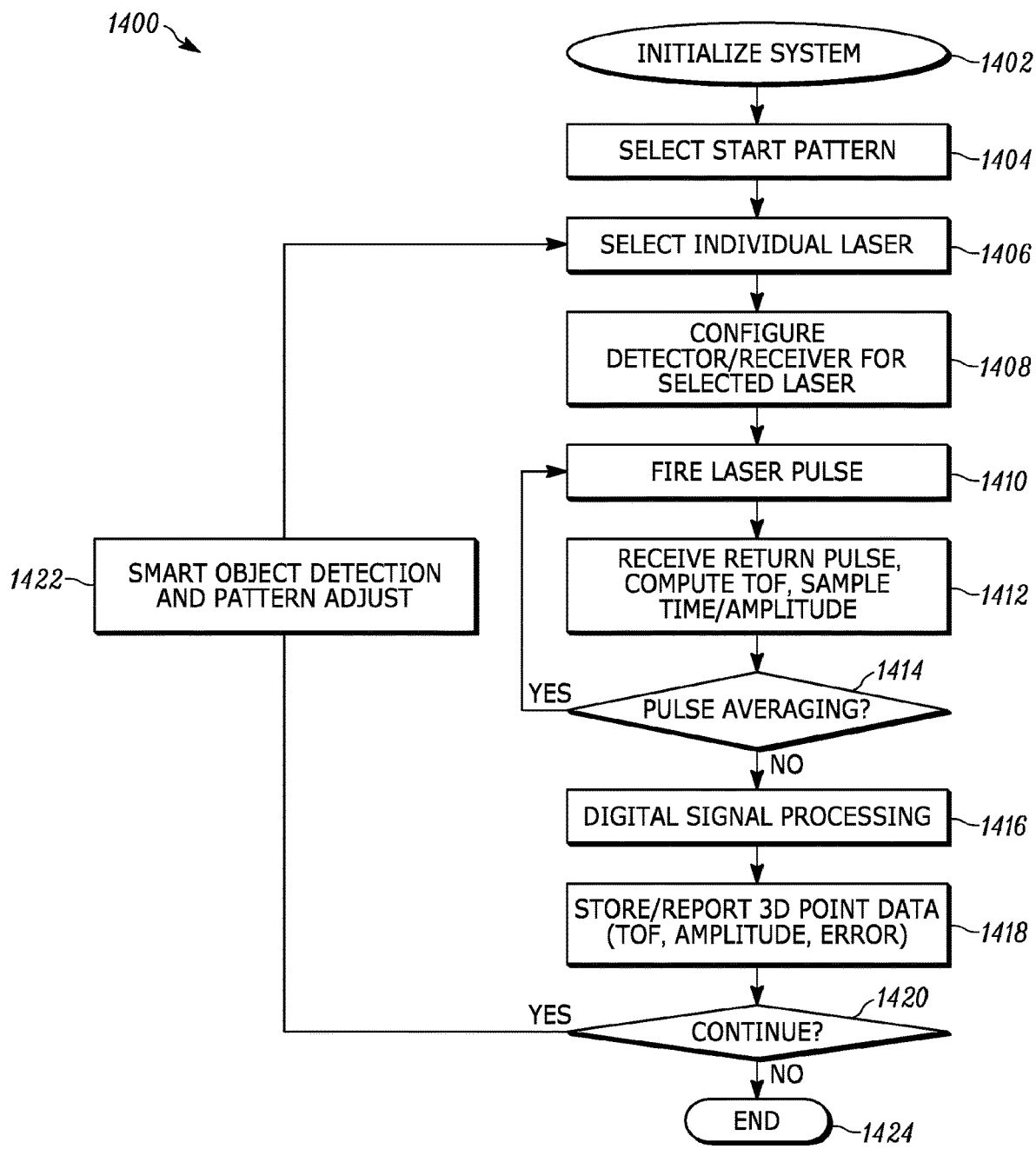
FIG. 14 illustrates a flow chart of an embodiment of a method to implement an algorithm of the noise-adaptive solid-state LIDAR system of the present teaching that incorporates smart object detection.

FIG. 14 illustrates a flow chart 1400 of a method 1400 to implement an algorithm of the noise-adaptive solid-state LIDAR system of the present teaching that incorporates smart object detection. Several steps of the method 1400 are similar or identical to the method 1300 described in connection with FIG. 13. Some description of similar steps is not repeated. In the first step 1402 of the method 1400, the system is initialized. In the second step 1404, a desired illumination pattern for generating the 3D point cloud is selected by the controller. In the third step 1406 of the method 1400, the controller selects an individual laser, or group of lasers, to fire based on the desired pattern. The controller then configures the controllable detector array and receiver to minimize the measurement noise in the fourth step 1408 of the method 1400.

In the fifth step 1410 of the method 1400, the LIDAR system fires the laser or group of lasers that have been selected in step three 1406. In the sixth step 1412 of the method 1400, the LIDAR system receives the fired laser pulses at the controlled detector array and calculates TOF and samples amplitude/time as desired. The system determines whether pulse averaging is implemented in step seven 1414 of the method 1400 and loops back to the fifth step 1410 if the desired number of pulses have been fired. In step eight 1416 of the method 1400, after obtaining the desired number of pulses for an individual laser or groups of lasers, the system can apply digital signal processing to manipulate the data in some fashion. After processing, the controller stores and/or communicates the data in the ninth step 1418 of the method 1400.

In the tenth step 1420 of the method 1400, a decision to stop or continue is made. If the decision is to continue, the system moves to the eleventh step 1422 of the method where a smart object detection and pattern adjust is performed. In this eleventh step 1422 of the method, the controller has the ability to analyze the 3D point cloud, and make decisions to adjust the pattern of the laser firing, as well as the pulse averaging to either address specific rules and/or to optimize the overall performance. For instance, an automotive LIDAR system could have a rule such that if the controller determined an object might potentially collide with the vehicle, that the LIDAR system could "lock onto" that object and change the pattern of firing and/or the field-of-view in order to increase the refresh rate and/or accuracy of the measurements of that object. In another embodiment, the controller might adjust the amount of pulse averaging, or firing patterns, for each individual laser based on various criteria such as a calculated probability of detection, error rate, distance to objects measured for each laser, and/or environmental conditions. The system moves to the twelfth step 1424 of the method 1400 to end the method if a decision to stop is made.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A light detection and ranging (LIDAR) system comprising:
    a) an optical transmitter comprising a plurality of lasers, each of the plurality of lasers illuminating a field-of-view;
    b) a transmitter controller having a plurality of electrical outputs, a respective one of the plurality of electrical outputs being connected to a respective input of each of the plurality of lasers, the transmitter controller being configured to pulse desired ones of the plurality of lasers so that the plurality of lasers generate light in a desired illumination region;
    c) an optical receiver comprising:
        i) a plurality of detectors positioned to detect light over the desired illumination region, the plurality of detectors generating an electrical detection signal;
        ii) an RF switch comprising an electrical output and a plurality of electrical inputs, each of the plurality of electrical inputs being connected to a respective electrical output of one of the plurality of detectors; and
        iii) a time-of-flight measurement circuit having an electrical input connected to the electrical output of the RF switch, the time-of-flight measurement circuit measuring a time-of-flight of light from the plurality of lasers to the plurality of detectors,
            wherein the optical receiver calculates range information from the time-of-flight measurements; and
    d) an optical receiver controller being electrically connected to the transmitter controller and having an output connected to an electrical input of the RF switch, the optical receiver controller being configured to direct at least some of the electrical inputs of the RF switch to the electrical input of the time-of-flight measurement circuit to achieve a desired noise level of the electrical detection signal.

2. The LIDAR system of claim 1 wherein at least two of the plurality of detectors are positioned to detect light in overlapping fields-of-views illuminated by at least two of the plurality of lasers.

3. The LIDAR system of claim 1 wherein the time-of-flight measurement circuit comprises a time-to-digital circuit.

4. The LIDAR system of claim 1 wherein the time-of-flight measurement circuit comprises an analog-to-digital convertor circuit.

5. The LIDAR system of claim 1 wherein at least one of the plurality of detectors in the optical receiver is selected from the group consisting of a PIN detector, a linear avalanche photodetector (APD), a Geiger-Mode APD, a silicon photomultiplier (SiPM), and a multi-pixel photon counter (MPPC).

6. The LIDAR system of claim 1 wherein at least one of the plurality of detectors comprises an array of detectors having at least some common electrical connections.

7. The LIDAR system of claim 1 wherein at least one of the plurality of detectors comprises an input filter that reduces an intensity of solar background light to an input of the detector.

8. The LIDAR system of claim 1 wherein at least one of the plurality of detectors is configured to have a restricted detection area field-of-view.

9. The LIDAR system of claim 1 wherein the transmitter controller is configured to pulse desired ones of the plurality of lasers with a number of pulses per duty cycle that achieves a receiver signal with a desired signal-to-noise ratio.

10. The LIDAR system of claim 9 wherein the transmitter controller is configured to pulse desired ones of the plurality of lasers with four or more pulses per duty cycle.

11. The LIDAR system of claim 9 wherein the transmitter controller is configured to pulse desired ones of the plurality of lasers with ten or more pulses per duty cycle.

12. The LIDAR system of claim 9 wherein the transmitter controller is configured to pulse desired ones of the plurality of lasers with twenty-five or more pulses per duty cycle.

13. The LIDAR system of claim 1 wherein at least two of the plurality of lasers emit a different wavelength.

* * * * *